United States Patent
Kim

(10) Patent No.: US 12,457,536 B2
(45) Date of Patent: Oct. 28, 2025

(54) METHOD AND APPARATUS FOR CHANNEL STATE INFORMATION PERFORMING RANDOM ACCESS IN MOBILE WIRELESS COMMUNICATION SYSTEM

(71) Applicant: Soenghun Kim, Hanam-si (KR)

(72) Inventor: Soenghun Kim, Hanam-si (KR)

(73) Assignees: Blackpin Inc., Seoul (KR); Soenghun Kim, Gyeonggi-do (KR)

( * ) Notice: Subject to any disclaimer, the term of this patent is extended or adjusted under 35 U.S.C. 154(b) by 0 days.

(21) Appl. No.: 18/904,821

(22) Filed: Oct. 2, 2024

(65) Prior Publication Data
US 2025/0126534 A1 Apr. 17, 2025

(30) Foreign Application Priority Data
Oct. 12, 2023 (KR) .................. 10-2023-0135633

(51) Int. Cl.
| | | |
|---|---|---|
| H04B 7/06 | (2006.01) | |
| H04W 36/04 | (2009.01) | |
| H04W 56/00 | (2009.01) | |
| H04W 72/231 | (2023.01) | |
| H04W 76/20 | (2018.01) | |

(52) U.S. Cl.
CPC .......... *H04W 36/04* (2013.01); *H04B 7/0626* (2013.01); *H04W 56/0015* (2013.01); *H04W 72/231* (2023.01); *H04W 76/20* (2018.02)

(58) Field of Classification Search
CPC ... H04W 76/30; H04W 36/04; H04W 72/231; H04W 56/0015; H04B 7/0626
See application file for complete search history.

(56) References Cited

U.S. PATENT DOCUMENTS

| | | | | |
|---|---|---|---|---|
| 2021/0112471 A1* | 4/2021 | Xu | ............... | H04W 72/0453 |
| 2024/0073471 A1* | 2/2024 | Prabhu | ............... | H04N 21/4825 |
| 2024/0163744 A1* | 5/2024 | Agiwal | ............ | H04W 36/0072 |
| 2024/0266556 A1* | 8/2024 | Teshima | ............. | H01M 8/0221 |
| 2024/0323777 A1* | 9/2024 | Agiwal | ................ | H04W 36/08 |
| 2024/0323895 A1* | 9/2024 | Manolakos | ........... | H04L 5/0051 |
| 2024/0340733 A1* | 10/2024 | Palle Venkata | ....... | H04W 36/04 |
| 2024/0373311 A1* | 11/2024 | Bala | ................ | H04W 36/00725 |
| 2024/0381190 A1* | 11/2024 | Bai | ................... | H04W 36/0058 |
| 2024/0388978 A1* | 11/2024 | Phuyal | ............ | H04W 36/00835 |

OTHER PUBLICATIONS

3GPP TS 38.212 V17.6.0, 3rd Generation Partnership Project; Technical Specification Group Radio Access Network; NR; Multiplexing and channel coding (Release 17), 204 pages.
3GPP TS 38.213 V17.7.0, 3rd Generation Partnership Project; Technical Specification Group Radio Access Network; NR; Physical layer procedures for control (Release 17), 263 pages.

(Continued)

*Primary Examiner* — Andrew Lee
(74) *Attorney, Agent, or Firm* — Fish & Richardson P.C.

(57) ABSTRACT

A technique for random access in conjunction with LTM operations is provided. The technique comprises performing an early random access procedure in a specific LTM candidate cell based on PDCCH order. Based on the early random access procedure, shorter cell switch delay is achieved. The specific LTM candidate cell is identified based on an implicit identifier determined from an explicit identifier indicated by the base station.

15 Claims, 19 Drawing Sheets

(56) References Cited

OTHER PUBLICATIONS

3GPP TS 38.214 V17.7.0, 3rd Generation Partnership Project; Technical Specification Group Radio Access Network; NR; Physical layer procedures for data (Release 17), 232 pages.
3GPP TS 38.321 V17.6.0, 3rd Generation Partnership Project; Technical Specification Group Radio Access Network; NRMedium Access Control (MAC) protocol specification (Release 17), 253 pages.
3GPP TS 38.331 V17.6.0, 3rd Generation Partnership Project; Technical Specification Group Radio Access Network; NR; Radio Resource Control (RRC) protocol specification (Release 17), Sep. 2023, 1337 pages.
CATT, "Report of [Post122][057][Mob18] 38.331 Running CR for CHO with candidate SCGs (CATT)," 3GPP TSG-RAN WG2 Meeting #123, R2-2307211, Aug. 21-25, 2023, 30 pages.
Ericsson, "RRC running CR for LTM," 3GPP TSG-RAN WG2 Meeting #123, R2-2308435, Aug. 21-25, 2023, 95 pages.
ETSI MCC, "Report of 3GPP TSG RAN WG2 meeting #123, Toulouse, France," 3GPP TSG-RAN WG2 meeting #123bis, R2-2309401, Aug. 21-25, 2023, 345 pages.
OPPO, "[AT123][028][Mob18] Understanding of MN-initiated and Sninitiated case (OPPO)," 3GPP TSG-RAN WG2 Meeting #123, R2-2309257, Aug. 21-25, 2023, 13 pages.
ZTE Corporation, "Report of Offline Discussion [016] for Early TA Acquisition and RACH-Less," 3GPP TSG RAN2#123 Meet, R2-2309247, Aug. 21-23, 2023, 28 pages.

* cited by examiner

| 4F-11 | CSI report number | CSI fields |
|---|---|---|
| | CSI report #n | SSBRI #1 |
| | | SSBRI #2 |
| | | ... |
| | | SSBRI #N |
| | | RSRP #1 |
| | | Differential RSRP #1 |
| | | ... |
| | | Differential RSRP #N |

| 4F-16 | CSI report number | CSI fields |
|---|---|---|
| | CSI report #n | SSBRI #1 |
| | | SSBRI #2 |
| | | ... |
| | | SSBRI #L*M |
| | | RSRP #1 |
| | | Differential RSRP #2 |
| | | ... |
| | | Differential RSRP #L*M |

| LTM-CSI-ReportConfig 0 |
| --- |
| LTM-CSI-ResourceConfigId: 0 |
| reportConfigType |
| > Periodic |
| >> PUCCH-CSI-Resource |
| >>> uplinkBandwidthPartId:0 |
| >>> PUCCH-ResourceId: 1 |
| LTM-ReportContent |
| > noOfReportedCells: n2 |
| > noOfReportedRS-PerCell: n2 |

4G-16

| LTM-CSI-ResourceConfig 0 | |
| --- | --- |
| > LTM-CSI-SSB-ResourceSet 0 | |
| >> ltm-CandidateId: 0 | |
| >> ltm-CSI-SSB-ResourceList | |
| >>> SSB-Index: 0 | SSBRI 0 |
| >>> SSB-Index: 1 | SSBRI 1 |
| >>> SSB-Index: 2 | SSBRI 2 |
| >>> SSB-Index: 3 | SSBRI 3 |
| > LTM-CSI-SSB-ResourceSet 1 | |
| >> ltm-CandidateId: 1 | |
| >> ltm-CSI-SSB-ResourceList | |
| >>> SSB-Index: 0 | SSBRI 4 |
| >>> SSB-Index: 4 | SSBRI 5 |
| >>> SSB-Index: 5 | SSBRI 6 |
| >>> SSB-Index: 9 | SSBRI 7 |
| > LTM-CSI-SSB-ResourceSet 3 | |
| >> ltm-CandidateId: 4 | |
| >> ltm-CSI-SSB-ResourceList | |
| >>> SSB-Index: 11 | SSBRI 9 |
| >>> SSB-Index: 12 | SSBRI 10 |
| >>> SSB-Index: 23 | SSBRI 11 |
| >>> SSB-Index: 24 | SSBRI 12 |
| >>> SSB-Index: 25 | SSBRI 13 |
| >>> SSB-Index: 26 | SSBRI 14 |

FIG.4G

| CSI report number | CSI fields |
|---|---|
| CSI report #n | SSBRI 5 (0101) in the SSBRI #1 (first entry); indicating SSB index 4 of SpCell of LTM-candidate 1/ LTM-CSI-SSB-ResourceSet 1 |
| | SSBRI 14 (1110) in the SSBRI #2 (second entry) |
| | SSBRI 13 (1101) in the SSBRI #3 (third entry) |
| | SSBRI 7 (0111) in the SSBRI #4 (fourth entry) |
| | RSRP for SSBRI 5 |
| | Differential RSRP for SSBRI 14 |
| | Differential RSRP for SSBRI 13 |
| | Differential RSRP for SSBRI 7 |

FIG.4H

| SpCell | Short-candidate-id |
|---|---|
| SpCell of current serving CG | 0 (unreserved value) |
| SpCell of LTM-Candidate 0 (type1) | 1 (lowest reserved value) |
| SpCell of LTM-Candidate 1 (type2) | no short-candidate-id |
| SpCell of LTM-Candidate 2 (type2) | no short-candidate-id |
| SpCell of LTM-Candidate 3 (type1) | 2 (second lowest reserved value) |
| SpCell of LTM-Candidate 4 (type1) | 3 (third lowest reserved value) |

FIG.4L

METHOD AND APPARATUS FOR CHANNEL STATE INFORMATION PERFORMING RANDOM ACCESS IN MOBILE WIRELESS COMMUNICATION SYSTEM

CROSS-REFERENCE TO RELATED APPLICATION

This application claims priority to and the benefit of Korean Patent Application No. 10-2023-0135633, filed on Oct. 12, 2023, the disclosure of which is incorporated herein by reference in its entirety.

TECHNICAL FIELD

The present disclosure relates to performing random access based on PDCCH order in wireless mobile communication system.

BACKGROUND

To meet the increasing demand for wireless data traffic since the commercialization of 4th generation (4G communication systems), the 5th generation (5G system) is being developed. 5G system introduced millimeter wave (mmW) frequency bands (e. g. 60 GHZ bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

When the UE passes from the coverage area of one cell to another cell, at some point a serving cell change need to be performed. Currently serving cell change is triggered by L3 measurements and is done by RRC signalling triggered Reconfiguration with Synch for change of PCell and PSCell, as well as release add for SCells when applicable, all cases with complete L2 (and L1) resets, and involving more latency, more overhead and more interruption time than beam switch mobility.

To meet the strict service requirements for the future mobile communication system, new mobility mechanism with less interruption time is required.

SUMMARY

Aspects of the present disclosure are to enable early random access for cell switch in conjunction with LTM operation. The method of the terminal includes receiving in a serving cell from a base station a RRC message, receiving in the serving cell from the base station a DCI associated with a PDCCH order wherein the DCI comprises a second identifier, performing a second uplink transmission in a cell determined based on the second identifier receiving from the base station a first MAC PDU wherein the first MAC PDU comprises a first identifier for cell switch, and performing a first uplink transmission in a cell determined based on the first identifier. The RRC reconfiguration message comprises one or more first identifiers. One or more second identifiers are determined based on a specific set of first identifiers.

BRIEF DESCRIPTION OF THE DRAWINGS

FIG. 4F is a diagram illustrating CSI report contents.

FIG. 4G is a diagram illustrating an example of mapping between CSI resource and SSBRI.

FIG. 4H is a diagram illustrating an example of CSI report contents.

FIG. 4L is a diagram illustrating an example of mapping between SpCells and short identifiers.

DETAILED DESCRIPTION

Hereinafter, embodiments of the present disclosure will be described in detail with reference to the accompanying drawings. In addition, in the description of the present disclosure, if it is determined that a detailed description of a related known function or configuration may unnecessarily obscure the gist of the present disclosure, the detailed description thereof will be omitted. In addition, the terms to be described later are terms defined in consideration of functions in the present disclosure, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

Figure 1:
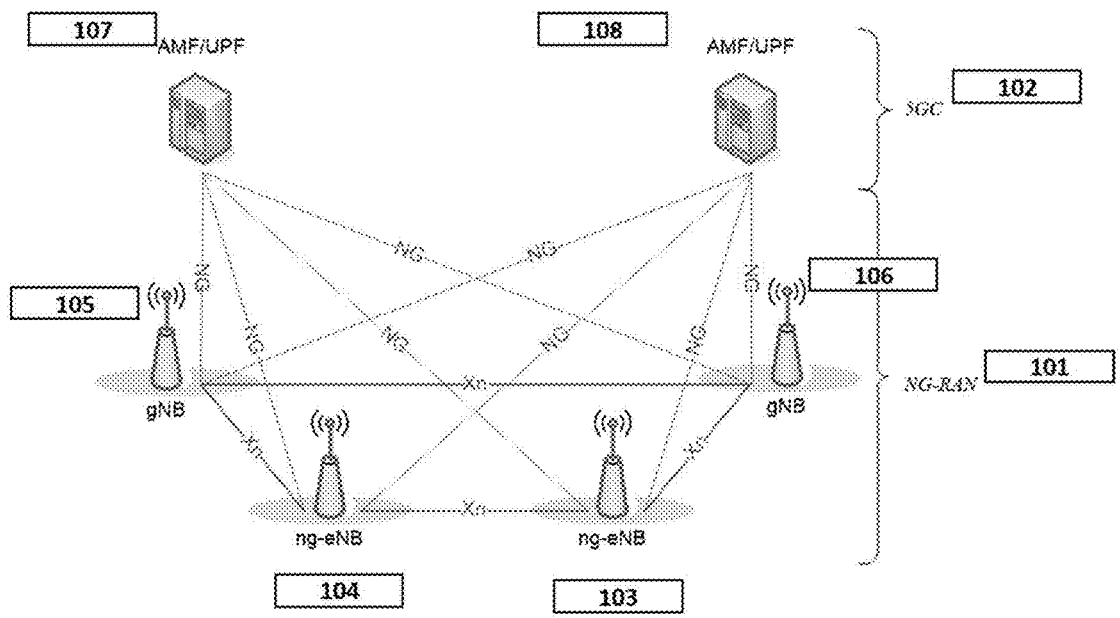
FIG. 1 is a diagram illustrating the architecture of an 5G system and a NG-RAN to which the disclosure may be applied.

In the present disclosure, followings are used interchangeably:

L2SR and LTM cell switch;
L3SR and handover;
SP CSI reporting on PUCCH Activation/Deactivation MAC CE and CSI report MAC CE;
LTM SP CSI reporting on PUCCH Activation/Deactivation MAC CE and
LTM CSI report MAC CE;
P CSI and periodic CSI;
SP CSI and Semi persistent CSI;

FIG. 1 is a diagram illustrating the architecture of an 5G system and a NG-RAN to which the disclosure may be applied.

5G system consists of NG-RAN 101 and 5GC 102. An NG-RAN node is either:
- a GNB, providing NR user plane and control plane protocol terminations towards the UE; or
- an ng-eNB, providing E-UTRA user plane and control plane protocol terminations towards the UE.

The GNBs 105 or 106 and ng-eNBs 103 or 104 are interconnected with each other by means of the Xn interface. The GNBs and ng-eNBs are also connected by means of the NG interfaces to the 5GC, more specifically to the AMF (Access and Mobility Management Function) and to the UPF (User Plane Function). AMF 107 and UPF 108 may be realized as a physical node or as separate physical nodes.

A GNB 105 or 106 or an ng-eNBs 103 or 104 hosts the functions listed below.

Functions for Radio Resource Management such as Radio Bearer Control, Radio Admission Control, Connection Mobility Control, Dynamic allocation of resources to UEs in uplink, downlink and sidelink (scheduling); and IP and Ethernet header compression, uplink data decompression and encryption of user data stream; and Selection of an AMF at UE attachment when no routing to an MME can be determined from the information provided by the UE; and Routing of User Plane data towards UPF; and
Scheduling and transmission of paging messages; and
Scheduling and transmission of broadcast information (originated from the AMF or O&M); and Measurement and measurement reporting configuration for mobility and scheduling; and
Session Management; and
QoS Flow management and mapping to data radio bearers; and
Support of UEs in RRC_INACTIVE state; and
Radio access network sharing; and
Tight interworking between NR and E-UTRA; and
Support of Network Slicing.

The AMF 107 hosts the functions such as NAS signaling, NAS signaling security, AS security control, SMF selection, Authentication, Mobility management and positioning management.

The UPF 108 hosts the functions such as packet routing and forwarding, transport level packet marking in the uplink, QoS handling and the downlink, mobility anchoring for mobility etc.

Figure 2:
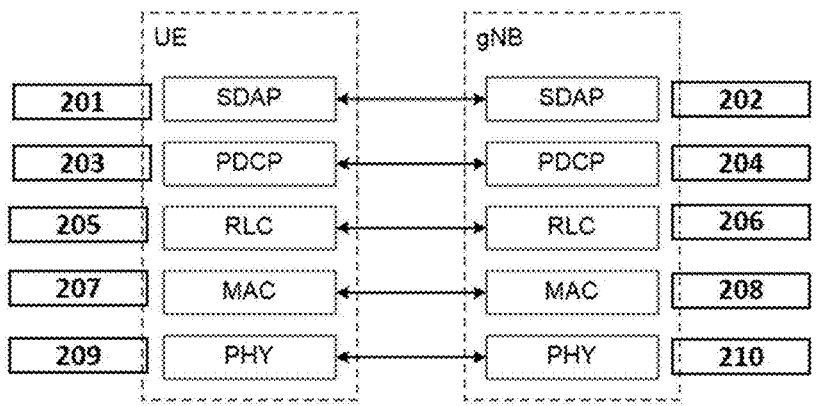
FIG. 2 is a diagram illustrating a wireless protocol architecture in an 5G system to which the disclosure may be applied.
Figure 2:
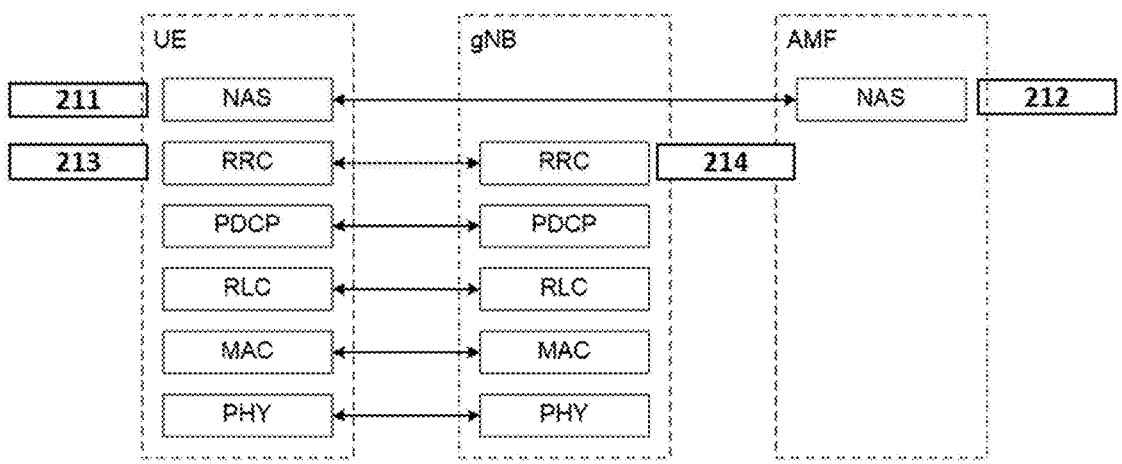

FIG. 2 is a diagram illustrating a wireless protocol architecture in an 5G system to which the disclosure may be applied.

User plane protocol stack consists of SDAP 201 or 202, PDCP 203 or 204, RLC 205 or 206, MAC 207 or 208 and PHY 209 or 210. Control plane protocol stack consists of NAS 211 or 212, RRC 213 or 214, PDCP, RLC, MAC and PHY.

Each protocol sublayer performs functions related to the operations listed below.

NAS: authentication, mobility management, security control etc

RRC: System Information, Paging, Establishment, maintenance and release of an

RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.

SDAP: Mapping between a QoS flow and a data radio bearer, Marking QoS flow ID (QFI) in both DL and UL packets.

PDCP: Transfer of data, Header compression and decompression, Ciphering and deciphering, Integrity protection and integrity verification, Duplication, Reordering and in-order delivery, Out-of-order delivery etc.

RLC: Transfer of upper layer PDUs, Error Correction through ARQ, Segmentation and re-segmentation of RLC SDUs, Reassembly of SDU, RLC re-establishment etc.

MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.

PHY: Channel coding, Physical-layer hybrid-ARQ processing, Rate matching, Scrambling, Modulation, Layer mapping, Downlink Control Information, Uplink Control Information etc.

Mobility is a key feature in mobile communications system. Conventional mobility feature relies on L3 measurements and L3 signaling, which may incur long delay and service interruption. To meet the strict service requirements for the future mobile communication system, L1/L2 Triggered Mobility (LTM) is introduced.

Figure 3:
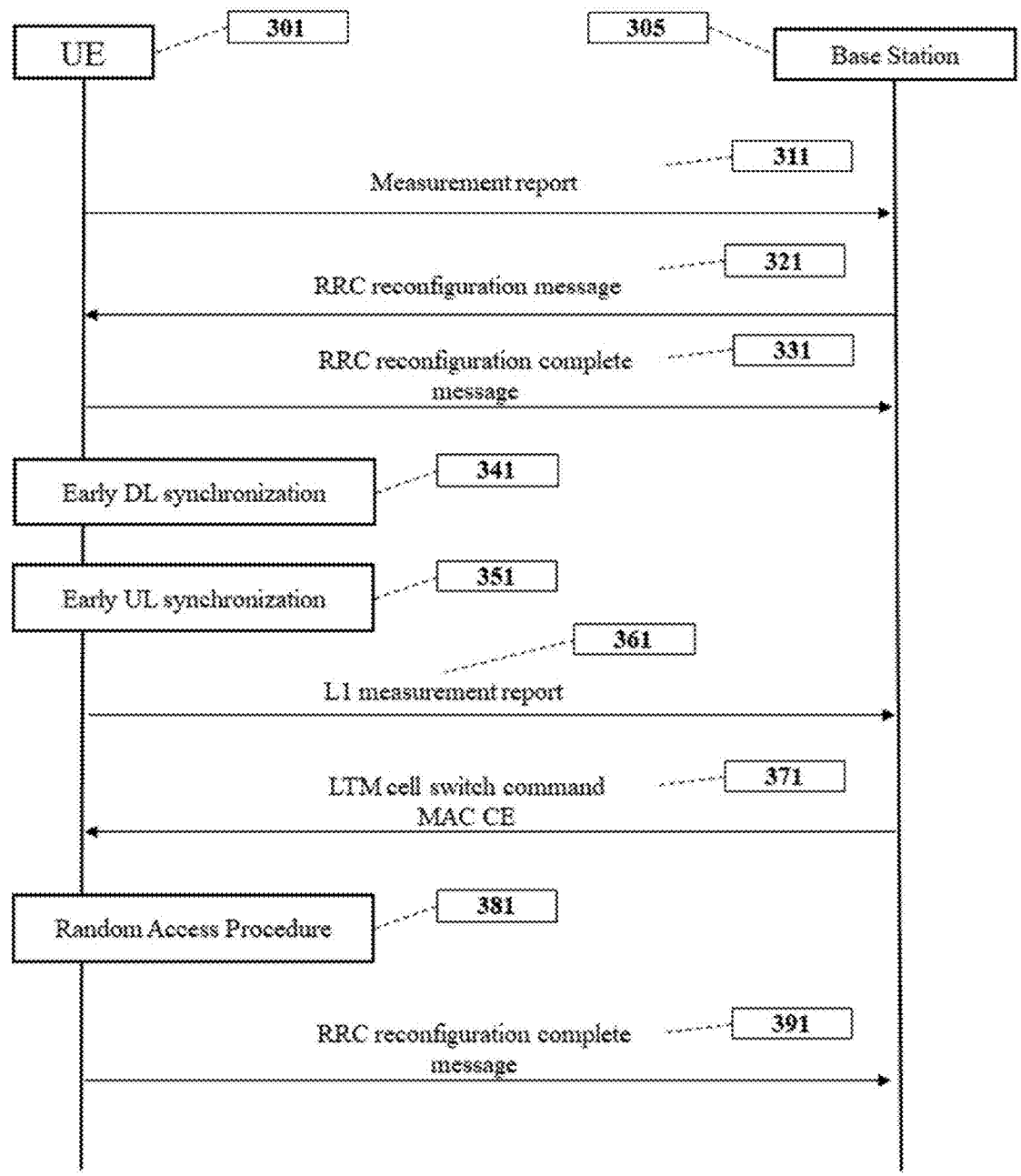
FIG. 3 is a diagram illustrating L1/L2 triggered mobility procedure.

FIG. 3 illustrates the overall procedure for LTM.

LTM is a procedure in which a GNB receives L1 measurement report (e.g. LTM CSI report) from a UE, and on their basis the GNB changes UE serving cell by a cell switch command signalled via a MAC CE. The cell switch command indicates an LTM candidate configuration that the GNB previously prepared and provided to the UE through RRC signalling. Then the UE switches to the target configuration according to the cell switch command.

The UE sends a MeasurementReport message to the GNB. The GNB decides to configure LTM and initiates LTM preparation 311.

The GNB transmits an RRCReconfiguration message to the UE including the LTM candidate configurations 321.

The UE stores the LTM candidate configurations and transmits an RRCReconfigurationComplete message to the GNB 331.

The UE performs early DL synchronization with the LTM candidate cell(s) before receiving the cell switch command 341. The UE may activate and deactivate TCI states of LTM candidate cell(s), as triggered by the GNB. For this operation, type 2 type 2 TCI state activation/deactivation MAC CE is used. Apart from the early DL synchronization with the LTM candidate cell, GNB may use type 1 TCI state activation/deactivation MAC CE to active TCI states of serving cells.

The UE may perform early UL synchronization with LTM candidate cell(s) 351 before receiving the cell switch command, by using UE-based TA measurement, if configured, and/or by transmitting a preamble towards the candidate cell, as triggered by the GNB. UE performs early TA acquisition with the candidate cell(s) as requested by the network before receiving the cell switch command.

The UE performs L1 measurements on the configured LTM candidate cell(s) and transmits L1 measurement reports (LTM CSI report) to the GNB 361.

The GNB decides to execute cell switch to a target cell and transmits an LTM cell switch command MAC CE 371 triggering cell switch by including a target configuration ID which indicates the index of the candidate configuration of the target cell, a beam indicated with a TCI state or beams indicated with DL and UL TCI states, and a timing advance command for the target cell. The UE switches to the target cell and applies the candidate configuration indicated by the target configuration ID.

The UE performs the random access procedure towards the target cell 381, if UE does not have valid TA of the target cell.

The UE completes the LTM cell switch procedure by sending RRCReconfigurationComplete message to target cell 391.

RRC reconfiguration procedure is used for mobility purpose, the procedure should be synchronous between the UE and the base station. In that sense, RRC reconfiguration for mobility purpose could be denoted as synchronous reconfiguration. When the reconfiguration for mobility is triggered by a layer 3 control message (e.g., RRC message), the reconfiguration is denoted as layer 3 triggered synchronous reconfiguration (L3SR) or as layer 3 triggered reconfiguration for mobility (e.g., L3RM). When the reconfiguration for mobility is triggered by a layer 2 control message (e.g., MAC CE), the reconfiguration is denoted as layer 2 triggered synchronous reconfiguration (L2SR) or as layer 2 triggered reconfiguration for mobility (e.g., L2RM).

Figure 4A:
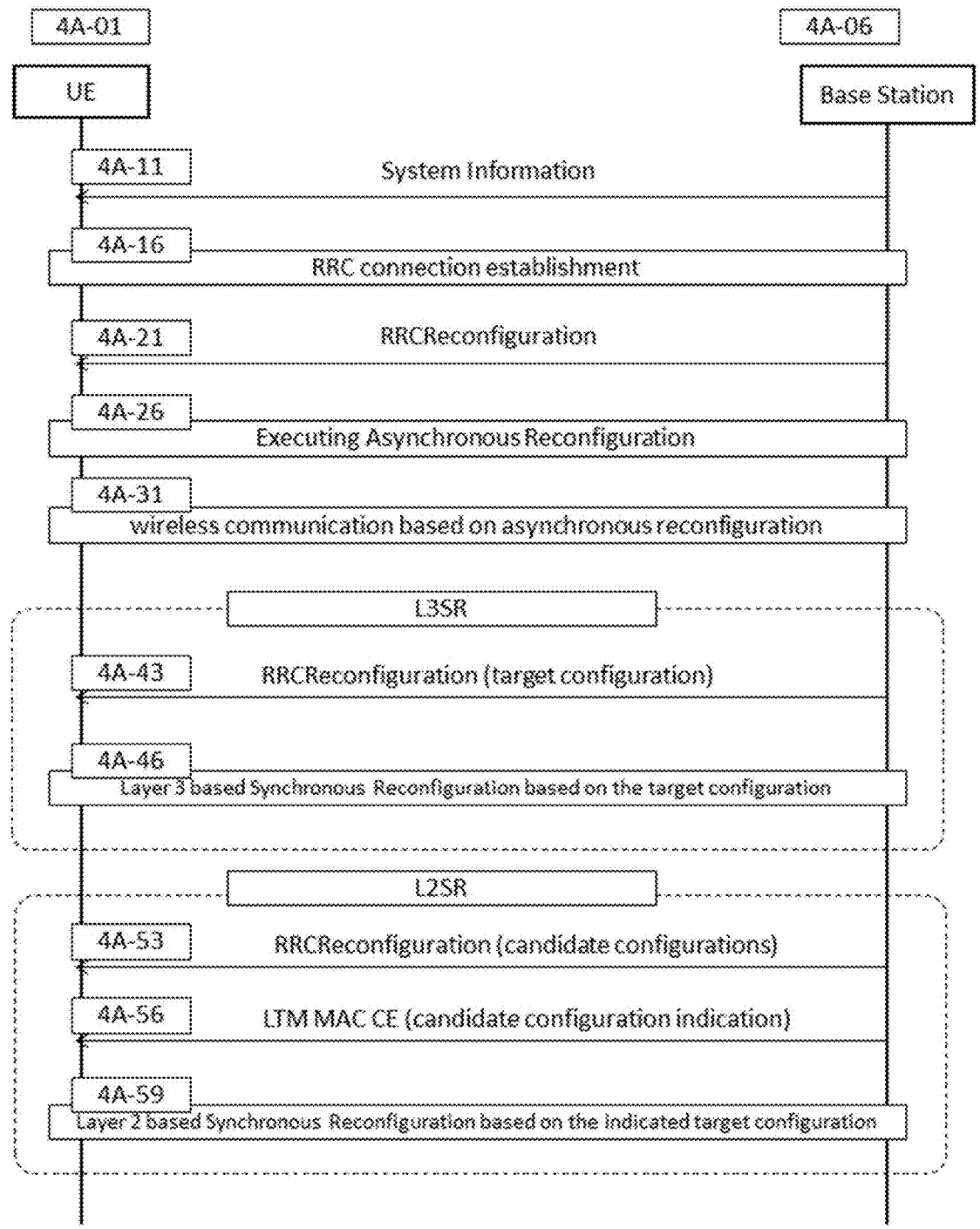
FIG. 4A is a diagram illustrating asynchronous reconfiguration and synchronous reconfiguration.

FIG. 4A illustrates the operation of a UE and a base station.

The UE 4A-01 is camping on a cell which is controlled by a base station 4A-06.

At 4A-11, UE receives system information from the base station. The system information includes ServingCellConfigCommonSIB to be applied by the UE in the cell.

At 4A-16, UE performs RRC connection establishment procedure with a base station based on the parameters contained in the ServingCellConfigCommonSIB. UE and the base station establish SRB1 during the RRC connection establishment procedure. The cell becomes SpCell of the UE after RRC connection establishment procedure.

In the RRC connection establishment procedure, UE receives from the base station a RRCSetup. The RRCSetup includes ServingCellConfig to be applied by the UE in the CELL1. The RRRCSetup includes RadioBearerConfig for SRB1.

After SRB1 establishment, UE may report its capability to the base station. The base station may decide the configuration to be applied to the UE based on the UE capability and traffic load status and traffic requirement. UE may report in which frequency bands the UE supports L3SR. UE may reports in which frequency bands UE supports L2SR.

RRC connection establishment procedure is performed along with random access procedure.

At 4A-21, The base station transmits a first RRCReconfiguration to the UE. The first RRCReconfiguration may include at least following IEs/fields:
  ServingCellConfig (or one or more fields contained in the IE); this IE, if included, replaces ServingCellConfig (or one or more field contained in the IE) received in RRCSetup;
  RadioBearerConfig; the UE and base station establishes SRB2 and SRB4 based on this IE; the UE and the base station establishes one or more DRBs based on this IE.

At 4A-26, UE and the base station perform/execute asynchronous reconfiguration procedure based on the configuration information included in the first RRCReconfiguration.

UE and base station determine to perform asynchronous reconfiguration procedure if the corresponding RRCReconfiguration does not include Reconfugration WithSync IE.

UE applies the configuration information in the first RRCReconfiguration at time_point_1 and the base station applies the configuration information at time_point_2. The time_point_1 is when UE decodes the configuration information. The time_point_2 is when the base station consider transmission of the RRCReconfiguration containing the configuration information is successful (e.g. when HARQ ACK for the RRCReconfiguration is received).

After completion of the asynchronous reconfiguration procedure, UE and the base station perform wireless communication based on the following configuration 4A-31:
  ServingCellConfigCommonSIB (e.g. broadcasted common serving cell configuration) received in the SIB1 of the SpCell (if ServingCellConfigCommon is not provided in RRCSetup) or ServingCellConfigCommon (e.g. dedicatedly delivered common serving cell configuration) in RRCSetup (if ServingCellConfigCommon is provided in RRCSetup);
  ServingCellConfig (e.g. dedicate serving cell configuration) received in the RRCSetup (if the first RRCReconfgiration does not include ServingCellConfig) or in the first RRCReconfiguration (if the first RRCReconfiguration includes ServingCellConfig);
  RadioBearConfig (e.g. radio bearer configuration) received in the first RRCReconfiguration (for SRB2 and SRB4) or RadioBearerConfig receive in the RRCSetup (SRB1);

UE performs following operation based on ServingCellConfigCommonSIB received in the SIB1 of the SpCell:
  initial BWP determination based on downlinkConfigCommon and uplinkConfigCommon;
  contention based random access procedure in the initial BWP based on RACH-ConfigCommon (e.g. common RACH configuration);
  uplink timing alignment based on n-TimingAdvanceOffset;

UE performs following operations based on ServingCellConfig received in the RRCSetup or in the first RRCReconfiguration:
  BWP switching based on one or more BWP configuration information;
  CSI reporting based on CSI-ReportConfig;
  Scheduling Request based on SchedulingRequestResourceConfig;
  SRS transmission based on SRS-Config;
  TimeAlignmentTImer maintenance (e.g. setting the value of the timer) based on timeAlignmentTimer field for TAG 0

UE performs following operations based on RadioBearConfig received in the first RRCReconfiguration:
  RRC message transmission and reception via SRB1 based on SRBToAddMod in RRCSetup;
  RRC message transmission and reception via SRB2 and or SRB4 based on SRBToAddMod IEs in the first RRCReconfiguration;
  IP packet transmission and reception via DRBs based on DRBToAddMod IEs in the first RRCReconfiguration.

To support UE mobility, the base station may determine to perform either L2SR or L3SR.

If the base station determines to apply L3SR, the base station and the UE perform 4A-43 and 4A-46.

If the base station determines to apply L2SR, the base station and the UE perform 4A-53 and 4A-56 and 4A-59.

For L3SR, the base station transmits to the UE a second RRCReconfiguration 4A-43.

The second RRCReconfiguration comprises ReconfigurationWithSync IE that contains common serving cell configuration for the target SpCell. The second RRCReconfiguration comprises various configurations such as RadioBeearConfig if the configurations are required to be updated.

The UE and the base station performs L3SR based on the target configuration contained in the second RRCReconfiguration 4A-46.

When the L3SR is triggered: UE performs configurations based on the target configurations contained in the second RRCReconfiguration; UE sets the contents of RRCReconfigurationComplete based on the contents of the second RRCReconfiguration; and UE transmits the RRCReconfigurationComplete in the target cell.

The configuration information such as ReconfigurationWithSync comprises various information for the target SpCell. The UE performs downlink synchronization for the target SpCell.

To transmit the RRCReconfigurationComplete, the UE initiates random access procedure in the target SpCell.

When the random access procedure triggered for RRCReconfigurationComplete is successfully completed, the UE and the base station consider the L3SR is successfully completed.

For L2SR, the base station transmits to the UE a third RRCReconfiguration 4A-53.

The third RRCReconfiguration comprises LTM-Config IE that contains a reference configuration and one or more candidate configurations.

The reference configuration comprises an embedded RRCReconfiguration.

Each candidate configuration comprises an embedded RRCReconfiguration. Each candidate configuration is associated with an identifier (e.g. candidateId).

The embedded RRCReconfiguration of each candidate configuration contains delta configuration over the embedded RRCReconfiguration of the reference configuration.

The UE generates a complete/target/final candidate configuration for a candidate by combining the embedded RRCReconfiugration of the candidate configuration with the embedded RRCReconfiguration of the reference configuration. More specifically, the UE determines IE X (of field x) of the candidate configuration is the IE X of the final candidate configuration in case that:
  the IE X is present both in the candidate configuration and the reference configuration; or
  the IE X is present only in the candidate configuration.

UE determines IE Y (or field y) of the reference configuration as the IE Y of the final candidate configuration in case that the IE Y is present only in the reference configuration.

Based on the layer 1 measurements (e.g. LTM CSI measurement and LTM CSI report), the base station may determine that cell switch is required for the UE.

The base station transmits UE LTM MAC CE 4A-56.

The UE and the base station perform L2SR based on the final candidate configuration indicated in the LTM MAC CE 4A-59.

When the L2SR is triggered: UE performs configurations based on the stored final configuration indicated by the MAC CE; UE sets the contents of RRCReconfigurationComplete based on the contents of the embedded RRCReconfiguration of the candidate configuration indicated by the MAC CE; and UE transmits the RRCReconfigurationComplete in the target SpCell of the candidate configuration.

The configuration information such as switch_info comprises various information for the target SpCell. The UE performs downlink synchronization for the target SpCell.

To transmit the RRCReconfigurationComplete, the UE may either initiate random access procedure in the target SpCell or monitor PDCCH to acquire uplink grant or use configured grant (if configured).

The UE and the base station consider the L2SR is successfully completed, when:
  the random access procedure triggered for RRCReconfigurationComplete is successfully completed; or
  uplink grant for new transmission is received after transmission of the RRCReconfigurationComplete.

Figure 4B:
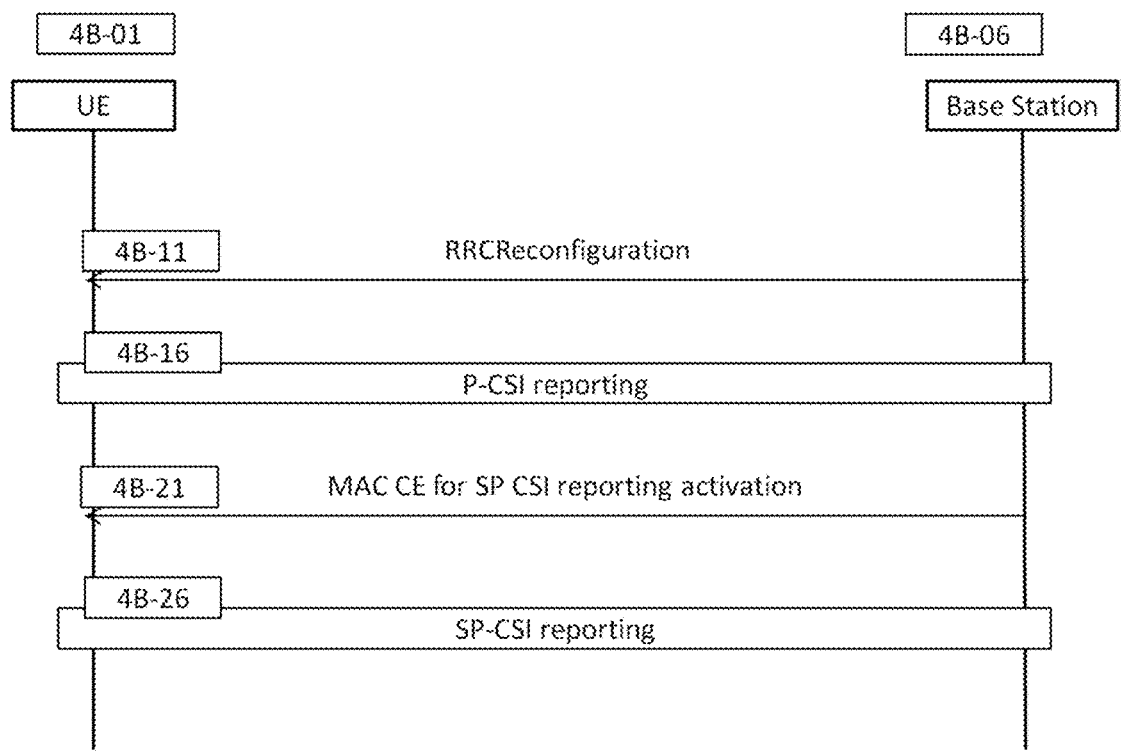
FIG. 4B is a diagram illustrating CSI reporting.

FIG. 4B illustrates operations for CSI reporting.

Current Serving/active Cell Group comprises Serving/active SpCell and Serving/active SCell. Candidate Cell Group comprises candidate SpCell and candidate SCell.

UE receives from the base station a RRCReconfiguration message 4B-11. The RRCReconfiguration message may contain followings:
  configuration parameters for a current serving cell group in a CellGroupConfig; and
  configuration parameters for cell groups of LTM candidates (e.g., one or more LTM-candidate) in a LTM-Config;

UE performs followings based on the RRCReconfiguration message 4B-16:
  periodic CSI reporting for serving cells (e.g., Non-LTM-CSI-reporting); and/or
  periodic CSI reporting for candidate SpCells (e.g., LTM-CSI-reporting).

UE receives from the base station a MAC CE for SP CSI reporting activation 4B-21.

UE performs followings based on the MAC CE for SP CSI reporting activation 4B-26.
  SP CSI reporting on PUCCH for current serving/active cell group; or
  LTM SP CSI reporting on PUCCH for candidate SpCell(s).

Figure 4C:
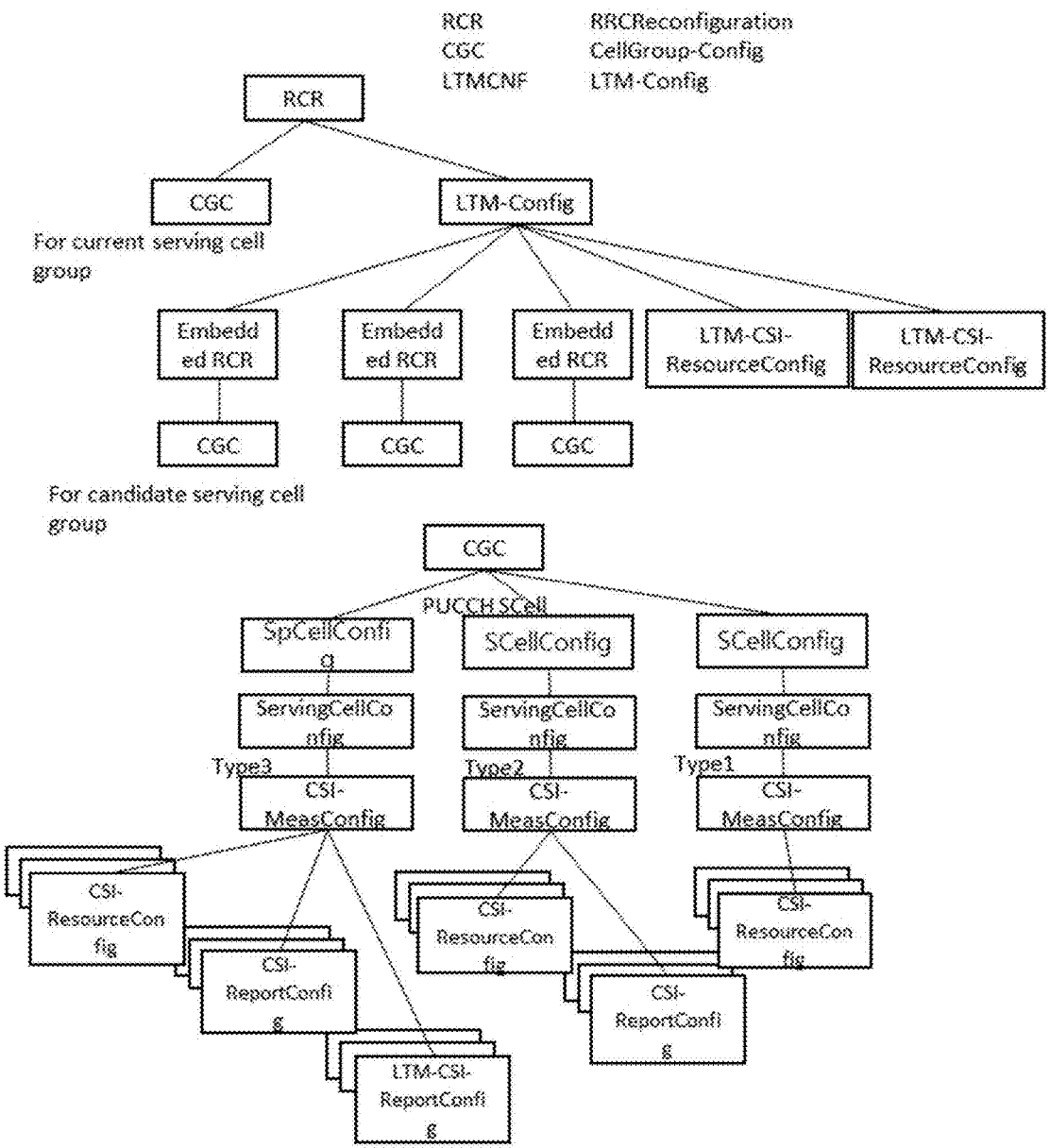
FIG. 4C is a diagram illustrating signaling structure of RRC reconfiguration message.

The RRCReconfiguration message is the command to modify an RRC connection. An example of signaling structure of the RRCReconfiguration message is illustrated in FIG. 4C.

The RRCReconfiguration message may comprises a cell group configuration (CGC) for current serving cell group and LTM configuration (LTM-Config) carrying various configuration information for LTM operation.

The LTM-Config may comprises followings:
  one or more embedded RRCReconfiguration messages, wherein each of the embedded RRCReconfiguration message comprises a cell group configuration for candidate cell group;
  one or more LTM-CSI-Resource configuration (list of LTM-CSI-ResourceConfig).

Base station needs to known channel state of the UE to perform scheduling or LTM operation. For scheduling purpose, the base station receives from the UE CSI report that carries channel state of serving cells of the current active cell group. For LTM purpose, the base station receives from the UE CSI report that carries channel state of candidate cells of candidate cell groups.

CSI resource is set of reference signals that are to be measured for channel state determination. For scheduling-oriented CSI reporting, UE measures CSI resource associated with current SpCell and current SCells. Based on the reported channel states, base station make proper decision on how much data is to be transmitted in which serving cell. CSI resource configuration for a serving cell and CSI report configuration for a serving cell are configured by CSI measurement configuration (CSI-MeasConfig) of the serving cell of the current active cell group.

CSI resource configuration comprises set of parameters that configures CSI-RSs that are associated with each serving cell. CSI report configuration comprises set of parameters that configures PUCCH resource for CSI reporting and indicates which CSI-RS is to be reported in the PUCCH resource.

CSI reporting is either periodic or semi-persistent. For periodic CSI reporting, UE starts CSI reporting when periodic CSI reporting is configured by CSI-MeasConfig in the RRCReconfiguration message. For semi-persistent CSI reporting, UE starts CSI reporting when a specific MAC CE is received.

For LTM-oriented CSI reporting, UE measures CSI resource associated with candidate SpCells. Based on the reported channel states, base station makes proper decision on whether to command cell switch and to which candidate SpCell. CSI resource configurations for LTM CSI reporting is not specific to a cell group but rather across cell groups. In that sense LTM CSI resource configuration is better put into a place that is independent from candidate cell groups. On the other hand, LTM CSI reporting configuration comprises set of parameters that configures PUCCH resource, wherein PUCCH resource is SpCell specific. Hence unlink LTM CSI resource configuration, LTM CSI reporting configuration should be placed under the configuration information of each SpCell.

Each cell group configuration comprises SpCell configuration and one or more SCell configurations. Both SpCell configuration and SCell configuartion comprise serving cell configuration (ServingCellConfig), which comprises CSI measurement configuration.

A CSI measurement configuration (CSI-MeasConfig) may comprise:
one or more CSI-ResourceConfig, wherein each comprises set of parameters for CSI resource for non-LTM CSI reporting;
one or more CSI-ReportConfig, wherein each comprises set of parameters for non-LTM CSI reporting configuration;
one or more LTM-CSI-ReportConfig, wherein each comprises set of parameters for LTM reporting configuration.

Depending on type of serving cell, corresponding CSI-MeasConfig may comprise different components. For the discussion, followings are defined:
Type 1 CSI-MeasConfig comprises one or more CSI-ResourceConfig;
Type 2 CSI-MeasConfig comprises one or more CSI-ResourceConfig and one or more CSI-ReportConfig;
Type 3 CSI-MeasCofnig comprises one or more CSI-ResourceConfig and one or more CSI-ReportConfig and one or more LTM-CSI-ReportConfig.

For SpCell, since non-LTM CSI reporting and LTM CSI reporting are required, type 3 CSI-MeasConfig is applied.

For PUCCH SCell, since non-LTM CSI reporting is required, type 2 CSI-MeasConfig is applied.

For other SCell, since CSI reporting is not performed, type 1 CSI-MeasConfig is applied.

A SCell configured with a type 1 CSI-MeasConfig provides the reference signal (CSI resources) for non-LTM CSI reporting.

A PUCCH SCell configured with a type 2 CSI-MeasConfig provides the reference signal (CSI resources) for non-LTM CSI reporting and the PUCCH resource for non-LTM CSI reporting.

A SpCell configured with a type 3 CSI-MeasConfig provide the reference signal (CSI resources) for non-LTM CSI reporting and the PUCCH resource for non-LTM CSI reporting and the reference signal (LTM-CSI resource) for LTM CSI reporting and the PUCCH resource for LTM CSI reporting.

Figure 4D:
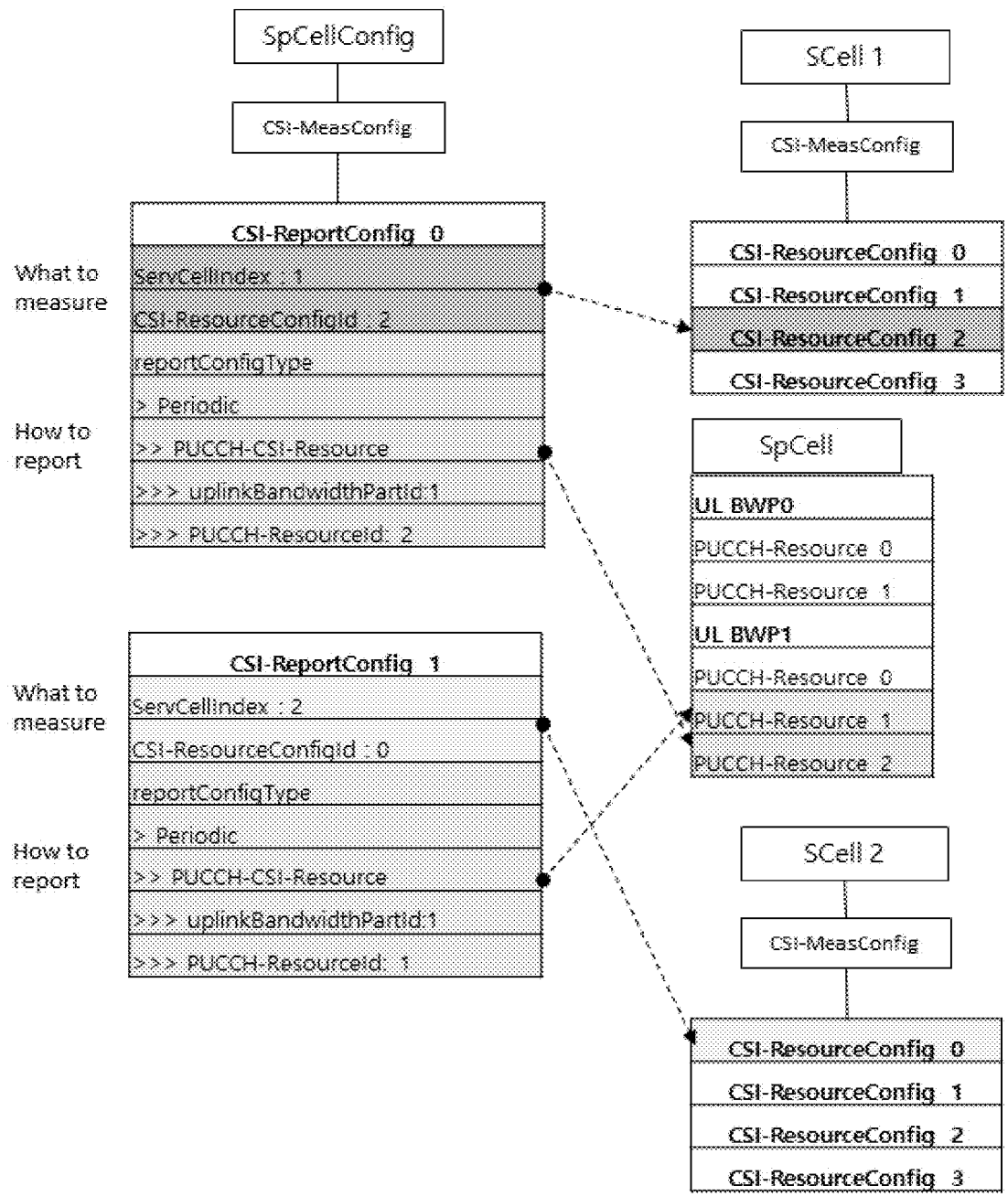
FIG. 4D is a diagram illustrating an example of configurations for CSI reporting.

FIG. 4D illustrates an example of non-LTM CSI reporting.

Assuming CSI-ReportConfig 0 and CSI-ReportConfig 1 are comprised in CSI-MeasConfig of SpCellConfg, UE performs periodic CSI reporting based on the CSI-ReportConfig 0 and CSI-ReportConfig 1. Based on those CSI reporting configurations, UE performs periodic CSI reporting for CSI-ResourceConfig2 of SCell1 on PUCCH-Resource 1 of SpCell. UE also performs periodic CSI reporting for CSI-ResourceConfig0 of SCell2.

UE may measure CSI-resources of a serving cell (e.g. SpCell or SCells) based on CSI-ResourceConfig in the CSI-MeasConfig of the serving cell. UE may report the P-CSI or SP-CSI on PUCCH for the serving cell based on CSI-ReportConfig in the CSI-MeasConfig of SpCell (or PUCCH SCell).

For non-LTM CSI reporting, a P-CSI report or a SP-CSI report on PUCCH may comprise various report quantity for a single serving cell (e.g. various quantity for a single serving cell can be reported in a P-CSI report or a SP-CSI report on PUCCH). The report quantity could be CRI-RI-PMI-CQI or CRI-RI-CQI or CRI-RRP or SSB-INDEX-RSRP or others. Basically, non-LTM CSI reporting can be performed for various types of reference signal (e.g. CSI-RS or SSB). Hence explicit parameter called reportQuantity configures which report quantity to be reported.

On the other hands, it is not useful to configure CSI-RS for LTM CSI reporting. CSI-RS is sharper than SSB which is good for fine scheduling. However, for mobility, wider beam such as SSB is more than enough for most cases. For LTM CSI reporting, reporting quantity is fixed to SSBRI (SSB resource indicator) without explicit parameter.

CSI-ReportConfig indicates what to measure (in ServCellIndex and CSI-ResorceConfigId) and how to report (in PUCCH-CSI-Resource).

For example, UE may report quantity measured on CSI-Resources associated with CSI-ResourceConfig2 of a SCell (ServCellIndex=1) is reported in the PUCCH-Resource (PUCCH-ResourceId=2) of UL BWP 1 of SpCell if one or CSI-ReportConfig in CSI-MeasConfig of the SpCell include followings:
ServCellIndex=1;
CSI-ResourceConfigId=2;
uplinkBandwidthPartId=1; and
PUCCH-ResourceId=2.

Figure 4E:
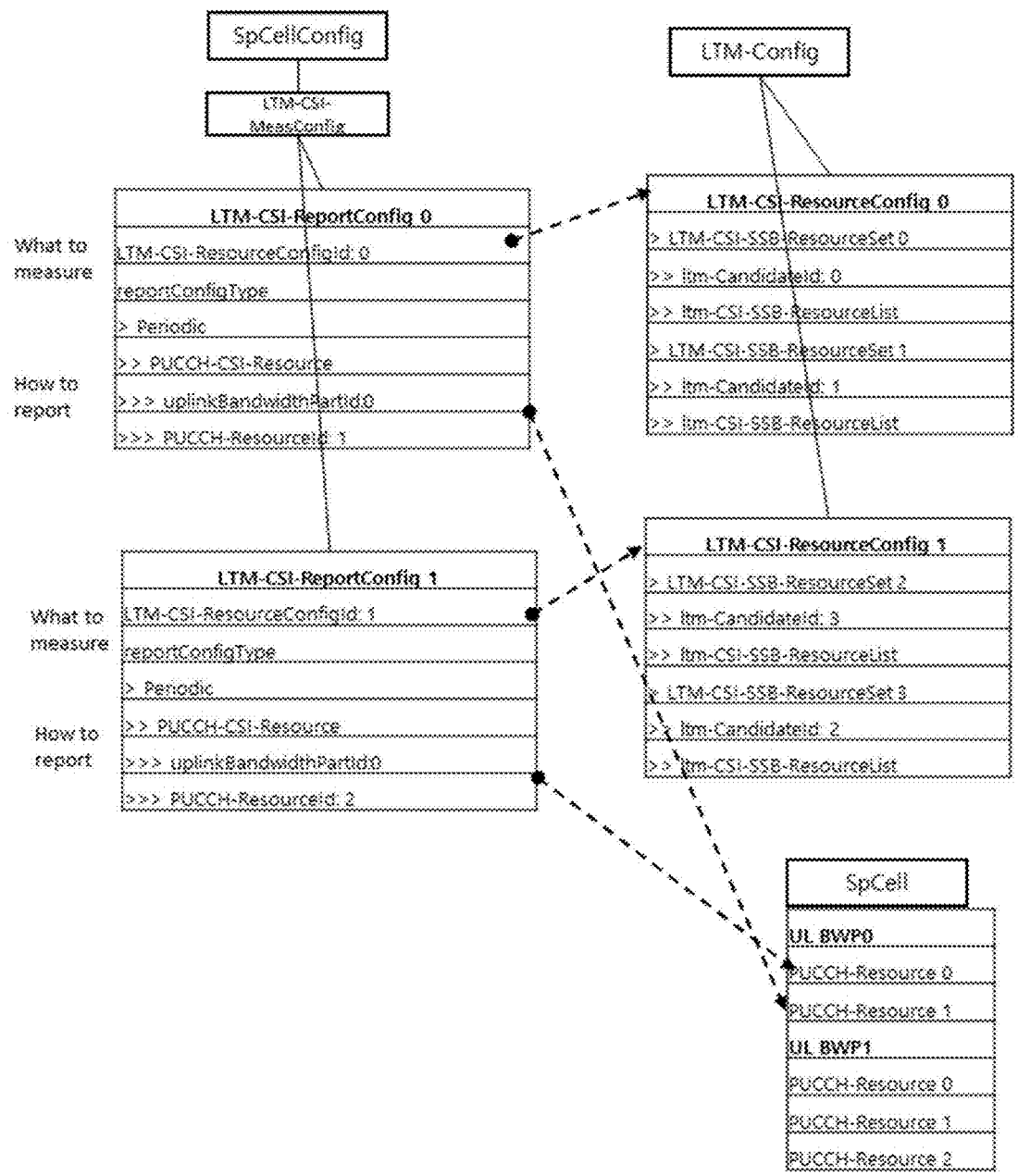
FIG. 4E is a diagram illustrating an example of configurations for LTM CSI reporting.

FIG. 4E illustrates an example of LTM CSI reporting.

LTM-CSI-MeasConfig in SpCellConfig comprises LTM-CSI-ReportConfig 0 and LTM-CSI-ReportConfig 1. UE performs periodic LTM CSI reporting on LTM-CSI-ResourceConfig 0 via PUCCH-Resource 1 of UL BWP 0 of SpCell. UE performs periodic LTM CSI reporting on LTM-CSI-ResourceConfig 1 via PUCCH-Resource 0 of UL BWP 0 of SpCell.

UE may measure LTM-CSI-SSB-Resources of one or more candidate SpCells based on LTM-CSI-ResourceConfig in the LTM-Config.

UE may report the P-CSI or SP-CSI on PUCCH for the serving cell based on LTM-CSI-ReportConfig in the CSI-MeasConfig of serving SpCell.

For LTM CSI reporting, a P-CSI report or a SP-CSI report on PUCCH may comprise a single type of report quantity for one or more candidate SpCells. The single type of the report quantity is not configured but fixed. The single type of the report quantity is ssb-Index-RSRP.

LTM-CSI-ReportConfig indicates what to measure (in LTM-CSI-ResourceConfigId) and how to report (in PUCCH-CSI-Resource).

For example, UE may report quantity measured on CSI-SSB-Resources associated with SpCell of LTM-candidate 0 and on CSI-SSB-Resource associated with SpCell of LTM-Candidate 1 via the PUCCH-Resource (PUCCH-ResourceId=1) of UL BWP 0 of SpCell, if one of LTM-CSI-ReportConfig in CSI-MeasConfig of the SpCell include followings:
LTM-CSI-ResourceConfigId=0, wherein LTM-CSI-Resource 0 consists with LTM-CSI-SSB-ResourceList of LTM-candidate 0 and LTM-CSI-SSB-ResourceList of LTM-candidate 1;
uplinkBandwidthPartId=0; and
PUCCH-ResourceId=1.

FIG. 4F illustrates an example of LTM CSI report contents.

For non-LTM CSI report 4F-11:
SSBRI #x is the $x^{th}$ entry of CSI report. When SSBRI #x indicates k, it means followings:
If the UE, for a PUCCH SCell or for a SpCell, is configured with a CSI-ReportConfig (within CSI-MeasConfig of the corresponding ServingCellConfig) with the higher layer parameter reportQuantity set to 'ssb-Index-RSRP' or 'ssb-Index-RSRP-Index', the UE shall report SSBRI, where SSBRI k (k≥0) corresponds to the configured $(k+1)^{th}$ entry of the associated csi-SSB-ResourceList in the corresponding CSI-SSB-ResourceSet.

Number of SSBRI entries in a CSI report is configured within a CSI-ReportConfig (or within CSI-MeasConfig). The size/bitwidth of SSBRI entries in a CSI report is determined implicitly based on the configured number of SS/PBCH blocks (e.g. number of SSB-Index) in the corresponding resource set (CSI-SSB-ResourceSet) such that at least one codeword of the SSBRI can be associated with each SS/PBCH block. For example, if the number of SS/PBCH blocks is 5, the SSBRI is 3 bit (=ceiling [log 25]). If the number of SS/PBCH blocks is 16, the SSBRI is 4 bit.

Within a LTM-CSI report 4F-16, L cells (each with M beams) are reported.

SSBRI #x is the xth entry of CSI report. When SSBRI #x indicates k, it means followings:
If the UE, for a SpCell, is configured with a LTM-CSI-ReportConfig (within CSI-MeasConfig of the corresponding ServingCellConfig), the UE shall report SSBRI, where SSBRI k (k≥0) corresponds to the configured $(k+1)^{th}$ entry across all ltm-csi-SSB-ResourceLists of the LTM-CSI-SSB-ResourceSets associated with the LTM-CSI-ReportConfig in the ascending/descending order of LTM-CSI-SSB-ResourceSetId. The entries of ltm-csi-SSB-ResourceLists are ordered according to the associated LTM-CSI-SSB-ResourceSetId (e.g. the first entry of the LTM-CSI-SSB-ResourceSet 0 corresponds to SSBRI0, the nth (and last) entry of the LTM-CSI-SSB-ResourceSet 0 corresponds to SSBRI n-1, the first entry of the LTM-CSI-SSB-ResourceSet 1 corresponds to SSBRI n and so on).

For example, When LTM-CSI-ReportConfig is as 4G-11, SSBRI k is mapped with each SSB-Index as 4G-16.

If SSBRI 10 is reported, it means SSB-Index 11 of LTM-CSI-SSB-ResourceSet3 (or SpCell of ltm-Canddidate 4).

Each SSB-Index of each LTM-CSI-SSB-ResourceSet indicates the corresponding SSB of the SpCell of the associated LTM-candidate.

SpCell of a LTM-candidate is the cell associated with SpCellConfig of the embedded RRCReconfiguration of the LTM-candidate.

SSB indexes of the LTM-CSI-ResourceConfig are ordered based on the LTM-CSI-SSB-ResourceSetId first and then SSB-Index next (e.g. SSB-Index x of LTM-CSI-SSB-ResourceSet n is ordered ahead of SSB-index x+y of LTM-CSI-SSB-ResourceSet m when m>n).

The size/bitwidth of SSBRI entries in a CSI report is determined implicitly based on the total configured number of SS/PBCH blocks (e.g. number of SSB-Index) across all the resource sets (LTM-CSI-SSB-ResourceSets) of the corresponding LTM-CSI-ResourceConfig such that at least one codeword of the SSBRI can be associated with each SS/PBCH block. For example, if the number of SS/PBCH blocks across all resource sets is 15, the SSBRI is 4 bit (=ceiling [log 215]).

UE may determine the number of SSBRIs to be reported based on noOfReportedCells and noOfReportedRS-PerCell in LTM-ReportContent (product of the two parameters).

In the example above, UE selects two LTM-CSI-SSB-ResourceSets (or candidate SpCells) and two SSB-Indexes from each set. The number of SSBRI entries is 4. The number of RSRP entry is 1. The number of differential RSRP entries is 3 (=the number of SSBRI entries−1).

UE includes the selected SSB-indexes in the CSI report as in FIG. 4H. lowest RSRP is placed first and highest RSRP is placed last.

To start or stop non-LTM SP CSI reporting:
SP CSI reporting on PUCCH Activation/Deactivation MAC CE is used;
SP CSI reporting on PUCCH Activation/Deactivation MAC CE is applied either to SpCell or to PUCCH SCell;
SP CSI reporting on PUCCH Activation/Deactivation MAC CE is received from any active serving cells; and
UE starts/stops SP CSI reporting on PUCCH of UL BWP x of Serving Cell y corresponding to Si field based on:
Serving Cell ID field (indicating Serving Cell y);
BWP ID field (indicating UL BWP x); and
Si field in the received SP CSI reporting on PUCCH Activation/Deactivation MAC CE.

To start or stop LTM SP CSI reporting:
SP LTM CSI reporting on PUCCH Activation/Deactivation MAC CE is used;
SP LTM CSI reporting on PUCCH Activation/Deactivation MAC CE is applied only to current active SpCell;
SP CSI reporting on PUCCH Activation/Deactivation MAC CE is received from any active serving cells; and
UE starts/stops SP CSI reporting on PUCCH of UL BWP x of SpCell corresponding to msi based on:
BWP ID field (indicating UL BWP x); and
mSi field in the received SP CSI reporting on PUCCH Activation/Deactivation MAC CE.

To start or stop non-LTM P CSI reporting:

P CSI reporting on PUCCH Activation/Deactivation RRCReconfiguration (including CSI-MeasConfig within which at least one CSI-ReportConfig with type set to periodic is included) is used;

P CSI reporting on PUCCH Activation/Deactivation RRCReconfiguration is applied either to SpCell or to PUCCH SCell;

P CSI reporting on PUCCH Activation/Deactivation RRCReconfiguration is received from any active serving cells; and UE starts/stops P CSI reporting based on following parameters in P CSI reporting on PUCCH Activation/Deactivation RRCReconfiguration:
csi-ReportConfig in csi-ReportConfigToAddModList of which type set to periodic; and
CSI-ReportConfigId in csi-ReportConfigToReleaseList that is associated with CSI-ReportConfig of which type set to periodic.

To start or stop LTM P CSI reporting:

LTM P CSI reporting on PUCCH Activation/Deactivation RRCReconfiguration (including CSI-MeasConfig within which at least one LTM-CSI-ReportConfig with type set to periodic is included) is used;

LTM P CSI reporting on PUCCH Activation/Deactivation RRCReconfiguration is applied only to current active SpCell;

LTM P CSI reporting on PUCCH Activation/Deactivation RRCReconfiguration is received from any active serving cells; and UE starts/stops LTM P CSI reporting based on following parameters in LTM P CSI reporting on PUCCH Activation/Deactivation RRCReconfiguration:
ltm-csi-ReportConfig in csi-ReportConfigToAddModList of which type set to periodic; and
LTM-CSI-ReportConfigId in ltm-csi-ReportConfigToReleaseList that is associated with LTM-CSI-ReportConfig of which type set to periodic.

UE may:

stop a P-CSI reporting or SP-CSI reporting on PUCCH when the corresponding CSI-ReportConfig is released by a RRC message;

stop a LTM P-CSI reporting or a LTM SP-CSI reporting on PUCCH of a SpCell when the LTM-CSI-ReportConfig of the SpCell is released by a RRC message; and stop all LTM P-CSI reporting and all LTM SP-CSI reporting on PUCCH when LTM-Config is released by a RRC message.

Figure 4I:
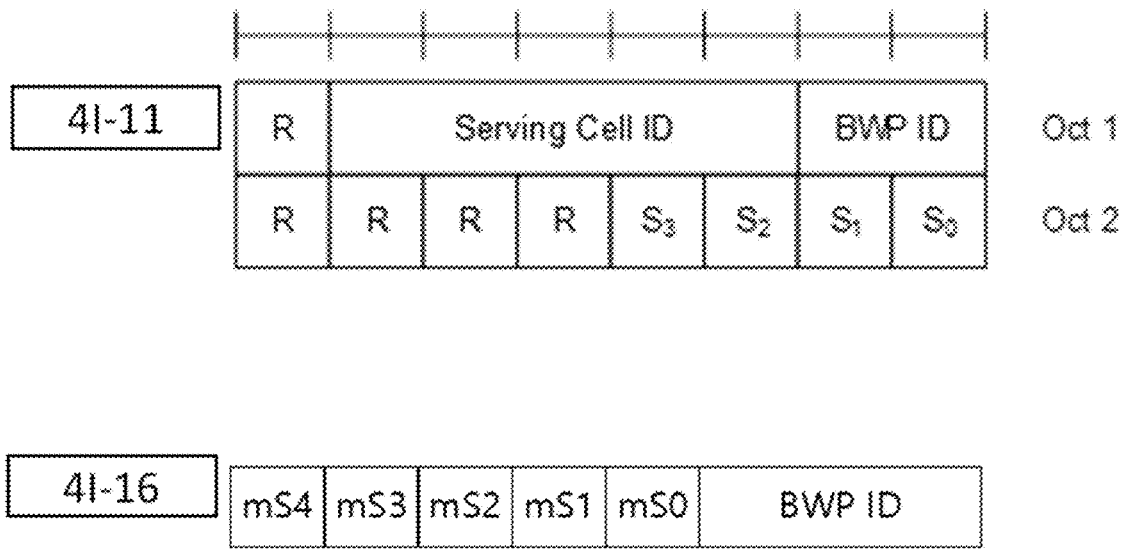
FIG. 4I illustrates format of MAC CE for CSI reporting.

FIG. 4I illustrates format of MAC CE for CSI reporting.

The SP CSI reporting on PUCCH Activation/Deactivation MAC CE 4I-11 is identified by a MAC subheader with LCID. It has a fixed size of 16 bits with following fields:

Serving Cell ID: This field indicates the identity of the Serving Cell for which the MAC CE applies. The length of the field is 5 bits;

BWP ID: This field indicates a UL BWP for which the MAC CE applies as the codepoint of the DCI bandwidth part indicator field. The length of the BWP ID field is 2 bits;

Si: This field indicates the activation/deactivation status of the Semi-Persistent CSI report configuration within csi-ReportConfigToAddModList. S0 refers to the report configuration which includes PUCCH resources for SP CSI reporting in the indicated BWP and has the lowest CSI-ReportConfigId within the list with type set to semiPersistentOnPUCCH, S1 to the report configuration which includes PUCCH resources for SP CSI reporting in the indicated BWP and has the second lowest CSI-ReportConfigId and so on. If the number of report configurations within the list with type set to semiPersistentOnPUCCH in the indicated BWP is less than i+1, MAC entity shall ignore the Si field. The Si field is set to 1 to indicate that the corresponding Semi-Persistent CSI report configuration shall be activated. The Si field is set to 0 to indicate that the corresponding Semi-Persistent CSI report configuration i shall be deactivated;

R: Reserved bit, set to 0.

The LTM SP CSI reporting on PUCCH Activation/Deactivation MAC CE 4I-16 is identified by a MAC subheader with eLCID. It has a fixed size of 8 bits (BWP ID 3 bit; mSi 5 bit) with following fields:

mSi: This field indicates the activation/deactivation status of the LTM Semi-Persistent CSI report configuration configured by ltm-CSI-ReportConfigToAddModList and ltm-CSI-ReportConfigToReleaseList in CSI-MeasConfig of the SpCell. mS0 refers to the report configuration which includes PUCCH resources for SP CSI reporting in the indicated BWP and has the lowest ltm-CSI-ReportConfigId within the list with type set to semiPersistentOnPUCCH, mS1 to the report configuration which includes PUCCH resources for SP CSI reporting in the indicated BWP and has the second lowest CSI-ReportConfigId and so on. If the number of report configurations within the list with type set to semiPersistentOnPUCCH in the indicated BWP is less than i+1, MAC entity shall ignore the mSi field. The Si field is set to 1 to indicate that the corresponding Semi-Persistent LTM CSI report configuration shall be activated. The Si field is set to 0 to indicate that the corresponding Semi-Persistent LTM CSI report configuration i shall be deactivated;

BWP ID: This field indicates a UL BWP for which the MAC CE applies as the codepoint of the DCI bandwidth part indicator field. The length of the BWP ID field is 2 bits;

Alternatively, The LTM SP CSI reporting on PUCCH Activation/Deactivation MAC CE is identified by a MAC subheader with eLCID. It has a fixed size of 8 bits (mSi 5 bit; R 3 bit) with following fields:

mSi: This field indicates the activation/deactivation status of the LTM Semi-Persistent CSI report configuration configured by ltm-CSI-ReportConfigToAddModList and ltm-CSI-ReportConfigToReleaseList in CSI-MeasConfig of the SpCell. mS0 refers to the report configuration which includes PUCCH resources for SP CSI reporting in a specific BWP and has the lowest ltm-CSI-ReportConfigId within the list with type set to semiPersistentOnPUCCH, mS1 to the report configuration which includes PUCCH resources for SP CSI reporting in the specific BWP and has the second lowest CSI-ReportConfigId and so on. If the number of report configurations within the list with type set to semiPersistentOnPUCCH in the indicated BWP is less than i+1, MAC entity shall ignore the mSi field. The Si field is set to 1 to indicate that the corresponding Semi-Persistent LTM CSI report configuration shall be activated. The Si field is set to 0 to indicate that the corresponding Semi-Persistent LTM CSI report configuration i shall be deactivated;

The specific BWP is the currently active UL BWP of the current serving SpCell.

Figure 4J:
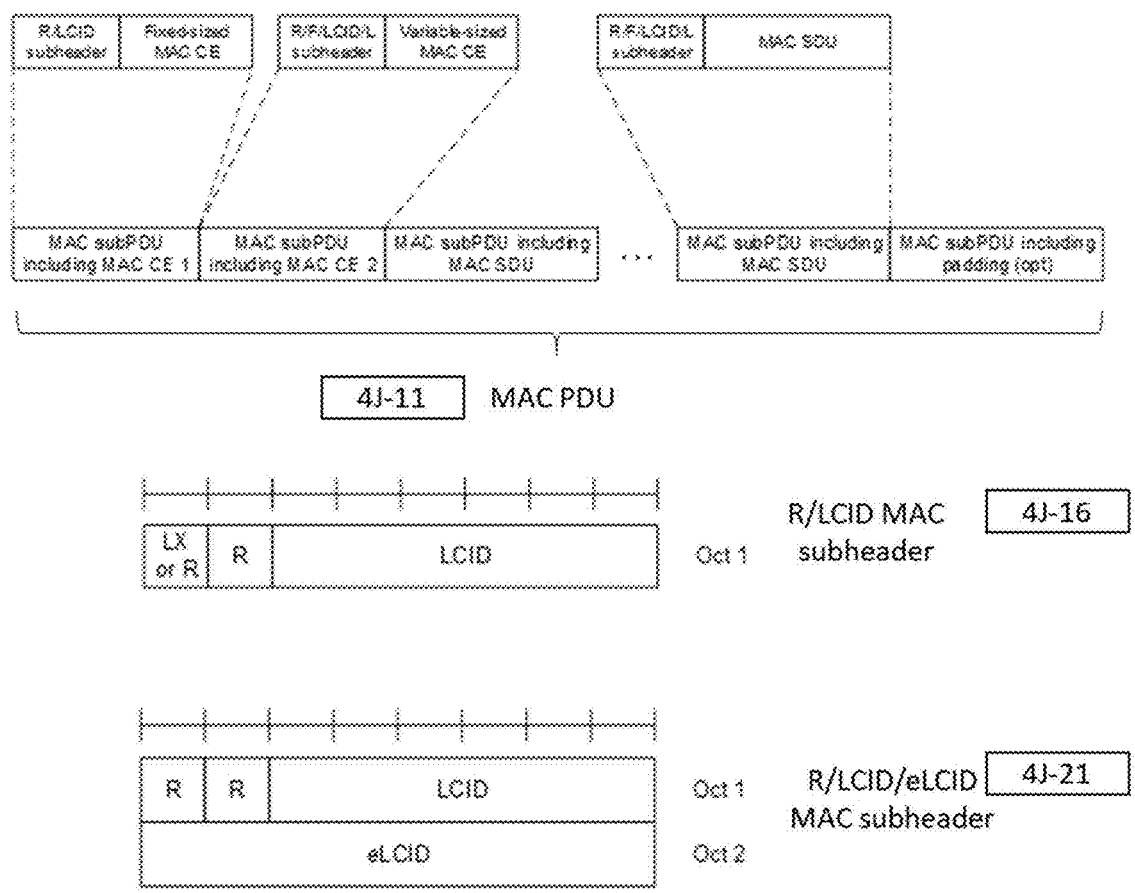
FIG. 4J illustrates format of MAC PDU and subheader.

FIG. 4J illustrates format of MAC PDU and subheader.

A MAC PDU consists of one or more MAC subPDUs. Each MAC subPDU consists of one of the following:

A MAC subheader only (including padding);
A MAC subheader and a MAC SDU;
A MAC subheader and a MAC CE; or
A MAC subheader and padding.

The MAC SDUs are of variable sizes. Each MAC subheader corresponds to either a MAC SDU, a MAC CE, or padding. A MAC subheader except for fixed sized MAC CE, padding, and a MAC SDU containing UL CCCH consists of the header fields R/F/LCID/(eLCID)/L. A MAC subheader for fixed sized MAC CE and padding consists of the header fields R/LCID/(eLCID). A MAC subheader for a MAC SDU containing UL CCCH consists of the header fields (LX)/R/LCID.

A MAC subheader for SP CSI reporting on PUCCH Activation/Deactivation MAC CE consists of the header fields R/LCID. LCID is set to a specific value associated with the MAC CE. A MAC subheader for LTM SP CSI reporting on PUCCH Activation/Deactivation MAC CE consists of the header fields R/LCID/eLCID. LCID is set to a specific value indicating that eLCID is following. eLCID is set to a specific value associated with the MAC CE.

The IE CSI-MeasConfig is used to configure CSI-RS (reference signals) belonging to the serving cell in which CSI-MeasConfig is included, channel state information reports to be transmitted on PUCCH on the serving cell in which CSI-MeasConfig is included and channel state information reports on PUSCH triggered by DCI received on the serving cell in which CSI-MeasConfig is included. The CSI-MeasConfig IE comprises following fields:
  csi-ResourceConfigToAddModList field that comprises a list of CSI-ResourceConfig;
  csi-ResourceConfigToReleaseList field that comprises a list of CSI-ResourceConfigIds;
  csi-ReportConfigToAddModList field that comprises a list of CSI-ReportConfig;
  csi-ReportConfigToReleaseList field that comprises a list of CSI-ReportConfigIds;
  ltm-CSI-ReportConfigToAddModList field that comprises a list of LTM-CSI-ReportConfig; and
  ltm-CSI-ReportConfigToReleaseList field that comprise a list of LTM-CSI-ReportConfigIds.

The IE CSI-ResourceConfig defines a group of one or more NZP-CSI-RS-ResourceSet, CSI-IM-ResourceSet and/or CSI-SSB-ResourceSet. The CSI-ResourceConfig comprises following fields:
  csi-ResourceConfigId field;
  nzp-CSI-RS-ResourceSetList field (comprising a list of NZP-CSI-RS-ResourceSetId) or csi-SSB-ResourceSetList (comprising a list of CSI-SSB-ResourceSetId); and
  bwp-Id field.

The IE CSI-SSB-ResourceSet is used to configure one SS/PBCH block resource set which refers to SS/PBCH as indicated in ServingCellConfigCommon and ServingCellConfig. The IE CSI-SSB-ResourceSet comprises a list of SSB-Index.

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). The CSI-ReportConfig comprises following fields:
  reportConfigId field;
  carrier field that comprises a ServCellIndex;
  resourcesForChannelMeasurement field that comprises CSI-ResourceConfigId;
  csi-IM-ResourcesForInterference field that comprises CSI-ResourceConfigId;
  nzp-CSI-RS-ResourcesForInterference field that comprsies CSI-ResourceConfigId;
  reportConfigType field that comprsies either periodic field (comprising parameters for report slot and pucch resource) or semiPersistentOnPUCCH field (comprising parameters for report slot and pucch resource);
  reportQuantity field.

The IE LTM-CSI-ReportConfig is used to configure report on the cell in which the LTM-CSI-ReportConfig is included. The LTM-CSI-ReportConfig comprises following fields:
  ltm-CSI-ReportConfigId field;
  ltm-ResourcesForChannelMeasurement field that comprises LTM-CSI-ResourceConfigId;
  ltm-ReportConfigType field that comprises either periodic field (comprising CSI-ReportPeriodicityAndOffset IE and one or more PUCCH-CSI-Resource IEs) or semiPersistentOnPUCCH-r18 field (comprising CSI-ReportPeriodicityAndOffset IE and one or more PUCCH-CSI-Resource IEs); and
  ltm-ReportContent field that comprises noOfReportedCells field and noOfReportedRS-PerCell field.

The IE LTM-CSI-ResourceConfig defines a group of one or more CSI resources for an LTM candidate cell configuration. The LTM-CSI-ResourceConfig IE comprises following fields.
  ltm-CSI-ResourceConfigId;
  ltm-CSI-SSB-ResourseSetToAddModList field that comprises one or more
  LTM-CSI-SSB-ResourseSet; and
  ltm-CSI-SSB-ResourseSetToReleaseList field that comprises one or more LTM-CSI-SSB-ResourseSetIds.

LTM-CSI-SSB-ResourceSet comprises following fields:
  ltm-CSI-SSB-ResourceSetId field;
  ltm-CandidateId field; and
  ltm-CSI-SSB-ResourceList field that comprises one or more SSB-Index.

Each SSB-Index in the LTM-CSI-SSB-ResourceSet IE is associated with ltm-CandidateId indicated by the ltm-CandidateId field.

Figure 4K:
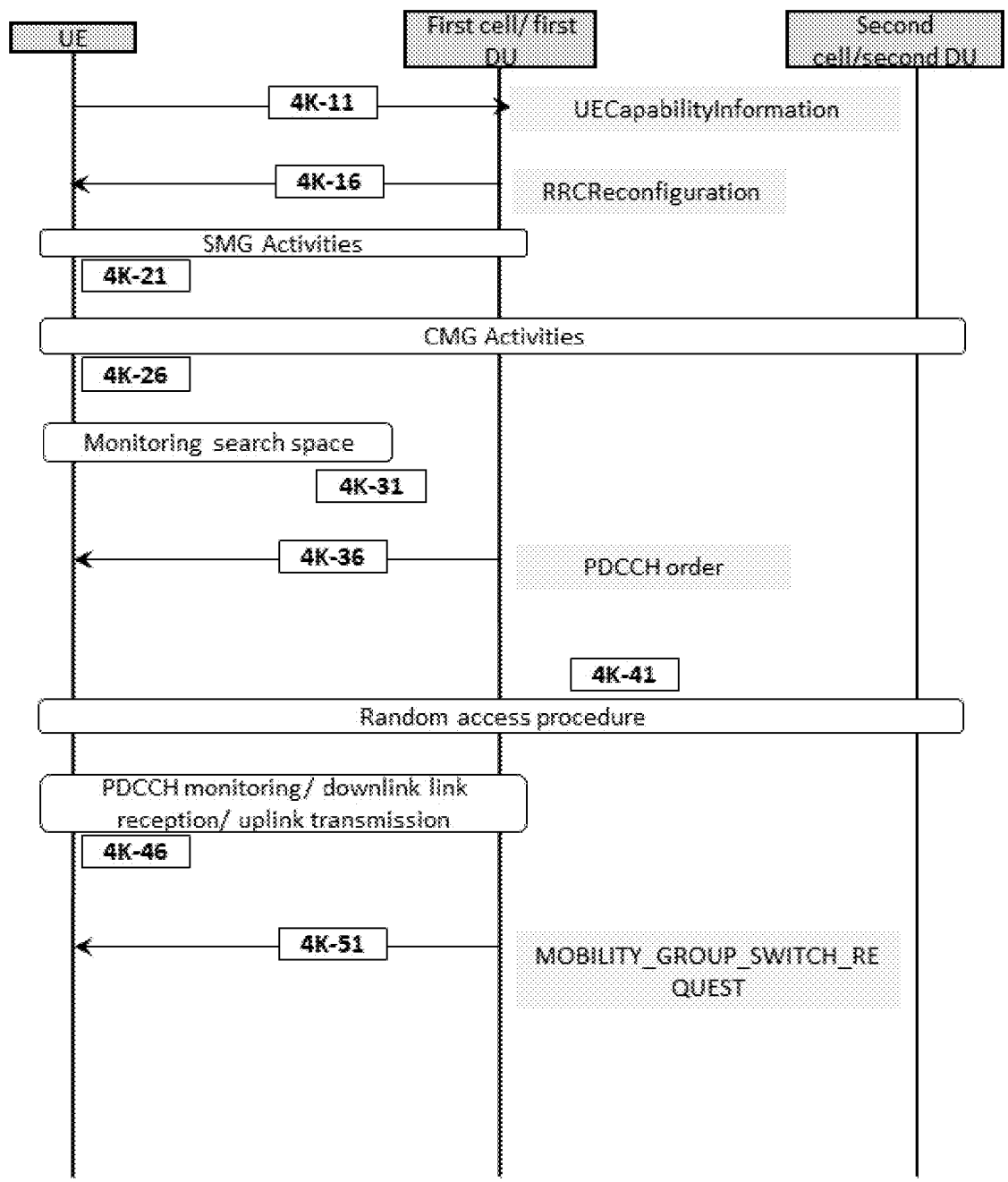
FIG. 4K is a diagram illustrating L1/L2 triggered mobility procedure.

FIG. 4K illustrates the operation of a terminal and a base station for random access for lower layer triggered mobility.

The terminal is in a first cell. The first cell is controlled by a first DU. The first DU is controlled by a first CU. The first CU is connected with the first DU and a second DU. The first CU and the first DU and the second DU composes a base station. The second cell is controlled by the second DU.

In 4K-11, the terminal in the first cell transmits to the base station a RRC message for capability reporting. (UECapabilityInformation).

The UECapabilityInformation comprises following capability information.

One or more GroupL2mobility IEs. Each GroupL2mobility IE indicates whether the terminal supports MAC CE based mobility for a corresponding band. If the IE is included for the band, it indicates the terminal supports following functionality for the band.
  Cell switch (mobility group switch) based on MOBILITY_GROUP_SWITCH_REQUEST MAC CE.
  Transmission of MOBILITY_GROUP_SWITCH_RESPONSE after mobility group switch.

Second random access procedure.

Reception of second TAC MAC CE in SMG.

NTA maintenance after the second random access procedure.

In 4K-16, the terminal receives a RRC message containing configuration information for the terminal (RRCReconfiguration).

The RRCReconfiguration comprises a SMG configuration information and a list of CMG configuration information.

The SMG configuration information includes following IEs:

one or more layer1 parameter sets for a one or more serving cell (ServingCellConfigCommon and ServingCellConfig). Each of layer1 parameter set is applied to a specific serving cell;

Layer 2 parameter set (MAC-CellGroupConfig) applied to the one or more serving cells;

SpCell specific parameter set (reconfiguration WithSync). This parameter set is applied to a specific serving cell; and Measurement configuration (MeasConfig). Measurement gap configuration (MeasGapConfig).

A CMG configuration information includes following IEs:

a CMG identifier; and an inner RRCReconfiguration. The inner RRCReconfiguration includes the configuration information of the CMG; one or more ServingCellConfig, one or more ServingCellConfigCommon, a MAC-CellGroupConfig, a reconfiguration WithSync, a MeasConfig and a MeasGapConfig.

The MAC-CellGroupConfig includes one or more TAG configuration information such as TAT value and TAG identifier. Each serving cell is assigned with a TAG identifier.

The MAC-CellGroupConfig includes one or two DRX configuration (DRX-Config).

In 4K-21, the terminal performs SMG operation for serving cells of the SMG.

The terminal performs a SMG_Active_Operation for an active serving cells. Active serving cells comprises a SpCell and one or more active secondary cells.

<SMG_Active_Operation>

UE monitors, based on the DRX configuration of the SMG and measurement gap configuration of the SMG, in the active downlink bandwidth parts of the active serving cells. UE monitors PDCCH during a first period.

UE receives, based on the measurement gap configuration of the SMG, PDSCH in the active downlink bandwidth parts of the active serving cells. UE receives PDSCH during a second period.

UE transmits, based on measurement gap configuration of the SMG, PUCCH for HARQ feedback and CSI report and SR in the active uplink bandwidth parts of one or two active serving cells. UE transmits PUCCH for HARQR feedback and CSI report and SR during a second period.

UE transmits, based on DRX configuration of the SMG and measurement gap configuration of the SMG, CSI on PUSCH in the active uplink bandwidth parts of one or more active serving cells. UE transmits CSI on PUSCH during a first period.

UE transmits, based on measurement gap configuration of the SMG and DRX configuration of the SMG, SRS in the active uplink bandwidth parts of one or more active serving cells. UE transmits SRS during a first period.

The first period is the period which is Active Time according to DRX configuration and not measurement gap according to measurement gap configuration.

The second period is the period which is not measurement gap according to measurement gap configuration.

In 4K-26, the terminal performs Candidate Mobility Group (CMG) operation for serving cells of the CMGs.

For each CMG, the terminal performs CMG_Preparation_Operaiton for a specific candidate cell. The specific candidate cell is the SpCell of the CMG. The specific candidate cell is candidate SpCell.

<CMG_Preparation_Operation>

For each inner RRCReconfiguration included in the CMG list, the terminal performs followings.

The terminal performs downlink synchronization for the specific cell based on ssb-PositionsInBurst and absoluteFrequencySSB indicated in reconfiguration WithSync IE of the corresponding inner RRCReconfiguration.

The terminal measures SSBs based on ssb-PositionsInBurst and absoluteFrequencySSB indicated in reconfiguration WithSync IE of the corresponding inner RRCReconfiguration.

The terminal determines pathloss based on SSB measurement.

The terminal receives MIB based on ssb-PositionsInBurst and absoluteFrequencySSB indicated in reconfiguration WithSync IE of the corresponding inner RRCReconfiguration.

The terminal determines SFN of the candidate SpCell based on the received MIB.

In 4K-31, the terminal monitors a one or more search spaces of the serving cells of SMG to receive PDCCH order.

The terminal monitors a first search space for a first PDCCH order. The terminal monitors a second search space for a second PDCCH order. The first search space and the second search space are configured in a reconfigurrationWithSync or in a one or more servingCellConfigCommon in SMG configuration. The first search space is for the first PDCCH order reception and for downlink scheduling and for uplink scheduling. The second search space is only for the second PDCCH order reception.

The first PDCCH order is transmitted to a terminal by the base station to trigger a first random access procedure of the terminal. The second PDCCH order is transmitted to a terminal by the base station to trigger a second random access procedure.

In 4K-36, the terminal receives a PDCCH order and performs random access procedure. The terminal performs the first RA procedure if the first PDCCH order is received. The terminal performs the second RA procedure if the second PDCCH order is received.

The first PDCCH order is transmitted by means of DCI format 1_0 with CRC scrambled by C-RNTI.

The first PDCCH order includes following information:

Frequency domain resource assignment field: This field is set to all ones;

Random Access Preamble index: This field indicates the preamble to be transmitted by the terminal; and SS/PBCH index field: this field indicates the SS/PBCH that shall be used to determine the RACH occasion for the PRACH transmission.

The second PDCCH order is transmitted by means of DCI format 1_0 with CRC scrambled by EUA-RNTI.

The second PDCCH order includes following information:

Frequency domain resource assignment field: This field is set to a predefined value e.g. all zeros or all bits set to one but the last one set to zero;

Random Access Preamble index: This field indicates the preamble to be transmitted by the terminal;

SS/PBCH information: this field indicates one or more SS/PBCHs that shall be used to determine one or more RACH occasions for the PRACH transmission. This field could consist with two sub-fields. The first sub-field indicates the first SS/PBCH index and the second sub-field indicates the number of consecutive SS/PBHC indexes starting from the first SS/PBHC index. To keep the commonality between the first PDCCH order and the second PDCCH order, the first sub-field and the second sub-field are located in non-adjacent places. More specifically, the first sub-field locates immediately after Random Access Preamble index field and the second sub-field locates after CMG identifier field. Terminal determines the one or more RACH occasions based on the SS/PBCH information in the PDCCH order and ssb-perRACH-Occasion AndCB-PreamblesPerSSB in the reconfiguration-WtihSync in the corresponding RRCReconfiguration. ssb-perRACH-OccasionAndCB-PreamblesPerSSB conveys the information about the number of SSBs per RACH occasion. Value oneEighth corresponds to one SSB associated with 8 RACH occasions, value one-Fourth corresponds to one SSB associated with 4 RACH occasions and so on;

Second PDCCH order indicator field: If this field is set to a first value, the DCI format 1_0 is the second PDCCH order. If this field is set to a second value, the DCI format 1_0 is the first PDCCH order;

CMG identifier: This field conveys an identifier of the CMG. The terminal determines the candidate SpCell where preamble is to be transmitted based on this field. Alternatively, this field comprises an identifier (e.g., short-candidate-id) derived from the CMG identifier. CMG identifier and ltm-CandidateId are used interchangeably.

Preamble transmission power information: This field conveys information related to preamble transmission. This field indicates whether the preamble transmission power shall be ramped up comparing to the last preamble transmission in the same candidate SpCell or the transmission power shall be same as the last preamble transmission in the same candidate SpCell. This field can indicate power ramping shall be initialized to zero (ramping step is initialized to zero). Alternatively, this field indicates one of predefined power offset that shall be added to the preamble transmission power.

In 4K-41, the terminal performs random access procedure.

If the first PDCCH order is received, the terminal performs the first random access procedure. If the second PDCCH order is received, the terminal performs the second random access procedure.

The terminal performs the first random access procedure as follows:

The terminal sets PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP; sum of The terminal sets transmission power to the PREAMBLE_RECEIVED_TARGET_POWER and pathloss of the serving cell where the first PDCCH order is received;

The terminal transmits the preamble in the RACH occasion determined from the SS/PBCH index field in the first PDCCH order. The terminal transmits the preamble in the active uplink bandwidth part of the serving cell where the first PDCCH order is received;

The terminal monitors PDCCH in a specific search space for a specific RNTI in a specific downlink bandwidth part of a specific serving cell. The specific serving cell is the serving cell where the preamble is transmitted. The specific downlink bandwidth part is the active downlink bandwidth part of the specific serving cell. The specific search space is indicated by ra-SearchSpace field in the configuration information of the specific serving cell. The specific RNTI is RA-RNTI. The terminal monitors PDCCH to receive a first random access response (RAR);

If the first RAR is not received, the terminal determines new transmission power based on new PREAMBLE_POWER_RAMPING_COUNTER and transmits the preamble with the new transmission power. The new the old PREAMBLE_POWER_RAMPING_COUNTER is PREAMBLE_POWER_RAMPING_COUNTER plus one.

The terminal performs the second random access procedure as follows:

The terminal sets PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP. PREAMBLE_POWER_RAMPING_COUNTER is determined based on the Preamble transmission power information field in the second PDCCH order. Alternatively, the terminal sets PREAMBLE_RECEIVED_TARGET_POWER to preambleReceivedTargetPower+DELTA_PREAMBLE+POWER_OFFSET. POWER_OFFSET is determined based on the Preamble transmission power information field in the second PDCCH order;

The terminal sets transmission power to the sum of PREAMBLE_RECEIVED_TARGET_POWER and pathloss of a candidate SpCell. The candidate SpCell is determined based on CMG identifier field in the second PDCCH order and Reconfiguration WithSync IE in the corresponding inner RRCReconfiguration;

The terminal transmits the preamble in the one or more RACH occasions determined from the SS/PBCH information field in the second PDCCH order. The terminal transmits the preamble in the one or more RACH occasions with the same transmission power with different spatial domain transmission filters (different uplink beams). The terminal transmits the preamble in a specific uplink bandwidth part of a specific cell. The uplink bandwidth part identifier of the specific uplink bandwidth part is indicated in the reconfiugration WithSync IE of the inner RRCReconfiguration message corresponding to CMG identifier. The specific cell is the candidate SpCell;

The terminal monitors PDCCH in a specific search space for a specific RNTI in a specific downlink bandwidth part of a specific serving cell. The specific serving cell is the serving cell where the second PDCCH order is received. The downlink bandwidth part identifier of the specific downlink bandwidth part is indicated in the reconfiugration WithSync IE of the inner RRCReconfiguration message corresponding to CMG identifier. The specific search space is UE specific search space. The specific RNTI is C-RNTI of the SMG. The terminal monitors PDCCH to receive a second RAR.

The terminal receives a first RAR if the random access procedure was triggered by the first PDCCH order. The terminal receives a second RAR if the random access procedure was triggered by the second PDCCH order. One or more first RAR are included in a MAC PDU. The terminal determines the first RAR for itself based on MAC subhead associated with the first RAR. Only a single second RAR is included in a MAC PDU.

The first RAR comprises following information:
Timing Advance Command (TAC): The Timing Advance Command field indicates the index value TA used to control the amount of timing adjustment that the terminal has to apply for a specific TAG. The size of the Timing Advance Command field is 12 bits. The specific TAG is SMG TAG to which the serving cell belong. The serving cell is the cell where the first PDCCH order is received;
UL Grant: The Uplink Grant field indicates the resources to be used on the uplink. The size of the UL Grant field is 27 bits; This field includes TPC command for PUSCH (Msg 3). This field includes MCS for PUSCH. This field includes PUSCH time resource allocation for PUSCH;
Temporary C-RNTI: The Temporary C-RNTI field indicates the temporary identity that is used by the MAC entity during Random Access. The size of the Temporary C-RNTI field is 16 bits.
The second RAR comprises following information:
CMG identifier: This field indicates CMG to which a candidate cell belongs to. The candidate cell is the cell where the preamble was transmitted. The candidate cell is SpCell indicated in the inner RRCReconfiguration corresponding to the CMG identifier;
Timing Advance Command: The Timing Advance Command field indicates the index value TA used to control the amount of timing adjustment that the terminal has to apply for a specific TAG. The size of the Timing Advance Command field is 12 bit. The specific TAG is primary TAG of CMG indicated by CMG identifier;
UL beam index: This field indicates the index of the uplink beam that the terminal shall applied in a specific uplink bandwidth part of a specific cell. The UL beam index is in the form of SS/PBHC index. The specific uplink bandwidth part is indicated in the inner RRCReconfiguration corresponding to CMG identifier. The specific cell is the candidate SpCell indicated in the inner RRCReconfiguration corresponding to CMG identifier.

Upon receiving a RAR, the terminal adjusts uplink transmission timing of an uplink of a specific cell (or specific TAG) based on TAC in the RAR and based on a downlink frame boundary of a specific cell.

In case of the first random access procedure, followings apply:
The terminal determines TA of a specific serving TAG based on TA (TA =0, 1, 2, . . . , 3846) in the TAC field in the first RAR;
The terminal determines NTA of the specific serving TAG. NTA=TA*16*64/SCS_COEEFICIENT. SCS_COEEFICIENT is predefined per subcarrier spacing. SCS_COEFFICIENT is 1 if SCS is 15 KHz. SCS_COEFFICIENT is 2 if SCS is 30 KHz. SCS_COEFFICIENT is 4 if SCS is 60 KHz. SCS_COEFFICIENT is 8 if SCS is 120 KHz. SCS_COEFFICIENT is 16 if SCS is 240 KHz, and so on;
The terminal determines TTA of the specific serving TAG. TTA=(NTA+NTA_OFFSET)*T_C. NTA_OFFSET is indicated in SIB1. T_C is a basic time unit for NR. T_C is equal to 1/(480*1000*4096) ms;

The terminal applies TTA such that the terminal starts uplink frame boundary of the specific serving TAG TTA before the start of the corresponding downlink frame of any serving cell of the specific TAG;
The specific serving TAG is the TAG where a specific serving cell belongs to. The specific serving cell is the serving cell where the preamble is transmitted. SCS_COEFFICIENT is determined based on the SCS of the first PUSCH transmission after the reception of the first random access response.

In case of the second random access procedure, followings apply:
The terminal determines TA of a specific candidate TAG based on TA (TA=0, 1, 2, . . . , 3846) in the TAC field in the second RAR;
The terminal determines NTA of the specific candidate TAG. NTA=TA*16*64/SCS_COEEFICIENT;
The terminal determines TTA of the specific candidate TAG. TTA=(NTA+NTA_OFFSET)*T_C. NTA_OFFSET is indicated in the corresponding inner RRCReconfiguration;
The terminal applies TTA such that the terminal starts uplink frame boundary of the specific candidate TAG TTA before the start of the corresponding downlink frame of a specific candidate cell;
The specific candidate TAG is the TAG where a specific candidate cell belongs to. The terminal determines the specific candidate cell based on CMG identifier field of the second RAR. The specific candidate cell is the candidate SpCell of the CMG indicated by the CMG identifier field. SCS_COEFFICIENT is determined based on the SCS of the preamble transmission after the reception of the second PDCCH order.

After the reception of the RAR, UE starts or restarts a TimeAlignmentTimer.

If the first RAR is received, UE starts or restarts a TimeAlignmentTimer (TAT) of a specific serving TAG. The specific serving TAG is the TAG where a specific serving cell belongs to. The specific serving cell is the serving cell where the preamble is transmitted.

When the TAT of the serving TAG expires, the terminal performs followings.

The terminal flushes all HARQ buffer for all serving cells of the TAG.

The terminal releases SRS for all serving cells of the TAG.

The terminal releases PUCCH for all serving cells of the TAG.

The terminal clears any configured downlink assignment and configured uplink grants for all serving cells of the TAG.

The terminal does not perform any uplink transmission on a serving cell except the random access preamble when the TAT associated with the TAG to which the serving cell belongs is not running.

If the second RAR is received, UE starts or restarts a TAT of a specific candidate TAG. The specific candidate TAG is the TAG where a specific candidate cell belongs to. The terminal determines the specific candidate cell based on CMG identifier field of the second RAR.

When the TAT of the candidate TAG expires, the terminal performs followings:

The terminal flushes all HARQ buffer for all candidate cells of the TAG;

The terminal releases SRS for all candidate cells of the TAG. Before expiry of TAT, SRS re suspended. The suspended SRS of a candidate cell is activated when the candidate cell is switched to a serving cell;

The terminal releases PUCCH for all candidate cells of the TAG. Before expiry of TAT, PUCCH are suspended. The suspended PUCCH of a candidate cell is activated when the candidate cell is switched to a serving cell;

The terminal clears any configured downlink assignment and configured uplink grants for all candidate cells of the TAG. Before expiry of TAT, configured assignments and configured grants are suspended. The suspended configured assignment and the suspended configured grants of a candidate cell are activated when the candidate cell is switched to a serving cell;

The terminal release the maintained/stored TTA and NTA of the candidate TAG.

The terminal does not perform any uplink transmission on a candidate cell except the random access preamble regardless of whether the TAT associated with the TAG to which the candidate cell belongs is running or not running.

TAT of SMG is to control uplink transmission and resource management (to release activated resource). TAG of CMG is to control NTA management and resource management (i.e. to release suspended resource)

In 4K-46, the terminal performs PDCCH monitoring and downlink reception and uplink transmission in the serving cells of SMG.

In 4K-51, the terminal receives a TAC MAC CE. If the first TAC MAC CE is received, the terminal (re) starts a TAT of the SMG. If the second TAC MAC CE is received, the terminal (re) starts a TAT of a CMG.

The first TAC MAC CE is identified by MAC subheader with a LCID. The first TAC MAC CE comprises following information:

TAG Identity (TAG ID): This field indicates the TAG Identity of the addressed TAG. The TAG containing the SpCell has the TAG Identity 0. The length of the field is 2 bits;

Timing Advance Command: This field indicates the index value TA (0, 1, 2 . . . 63) used to control the amount of timing adjustment that MAC entity has to apply The length of the field is 6 bits.

The terminal updates NTA of the serving TAG indicated by TAG ID field. The terminal adjusts uplink transmission of the serving TAG based on updated NTA.

The second TAC MAC CE is identified by MAC subheader with an eLCID. The second TAC MAC CE comprises following information:

CMG identifier: This field indicates CMG to which the TAG belongs;

TAG Identity (TAG ID): This field indicates the TAG Identity of the addressed TAG. The TAG containing the SpCell has the TAG Identity 0. The length of the field is 2 bits;

Timing Advance Command: This field indicates the index value TA (0, 1, 2 . . . 63) used to control the amount of timing adjustment that MAC entity has to apply The length of the field is 6 bits.

The terminal updates NTA of a specific TAG of a specific CMG. The specific CMG is indicated by CMG identifier field. The specific TAG is indicated by TAG Identity field.

The terminal maintains/stores the new NTA and the new TTA derived from the new NTA. The terminal (re) starts the TAT of the specific TAG of the specific CMG.

In 4K-51, the terminal receives from the base station a MOBILITY_GROUP_SWITCH_REQUEST MAC CE. The MOBILITY_GROUP_SWITCH_REQUEST MAC CE comprises a L2_RESET_INDICATOR field. If the field is set to a first value, UE performs L2_RESET_ACTIVITIES_1 for the MAC entity. If the field is set to a second value, UE performs L2_RESET_ACTIVITIES_2 for the MAC entity.

L2_RESET_ACTIVITIES_1 comprises following activities:

During L2_MOBILITY_PERIOD_1:
The terminal stops all TATs of all TAGs of the SMG;
The terminal stops ongoing Random Access procedure in SMG. The terminal continues ongoing Random Access procedure in CMG;
The terminal flush Msg3 buffer of SMG;
The terminal cancels triggered Scheduling Request procedure in SMG;
The terminal cancels triggered Buffer Status Reporting procedure in SMG;
The terminal cancels triggered Power Headroom Reporting procedure in SMG;
The terminal releases any configured uplink grants in SMG;
The terminal releases PUCCH in SMG;
The terminal releases SRS in SMG.

During L2_MOBILITY_PERIOD_3:
The terminal triggers Buffer Status Reporting procedure in CMG;
The terminal triggers Power Headroom Reporting procedure in CMG.

L2_RESET_ACTIVITIES_2 comprises following activities:

During L2_MOBILITY_PERIOD_1:
The terminal does not stop TATs of the SMG;
The terminal stops ongoing Random Access procedure in SMG. The terminal continues ongoing Random Access procedure in CMG;
The terminal cancels triggered Scheduling Request procedure in SMG;
The terminal cancels triggered Buffer Status Reporting procedure in SMG;
The terminal cancels triggered Power Headroom Reporting procedure in SMG;
The terminal suspends any configured uplink grants in SMG;
The terminal suspends PUCCH in SMG;
The terminal suspends SRS in SMG.

During L2_MOBILITY_PERIOD_3:
The terminal triggers Buffer Status Reporting procedure in CMG;
The terminal triggers Power Headroom Reporting procedure in CMG.

If the RAMDOM_ACCESS_REQUIRED_FIELD is set to a first value, UE performs RA_ACTIVITIES_1. If the field is set to a second value, UE performs RA_ACTIVITIES_2.

RA_ACTIVITIES_1 comprises following activities:
During L2_MOBILITY_PERIOD_1:
The terminal stops the TATs of the CMG;
The terminal clears configured grants in CMG;
The terminal releases suspended PUCCH in CMG;
The terminal releases suspended SRS in CMG.

During L2_MOBILITY_PERIOD_2:
The terminal triggers Random Access Procedure in the target candidate SpCell of the CMG;
The terminal generates MOBILITY_GROUP_SWITCH_RESPONSE MAC CE.

RA_ACTIVITIES_2 comprises following activities.
During L2_MOBILITY_PERIOD_1:
The terminal does not stop the TATs of the CMG;
The terminal does not clear configured grants in CMG.
During L2_MOBILITY_PERIOD_2:

The terminal applies maintained NTA and determines TTA for uplink transmission in the P-TAG of CMG;

The terminal monitor PDCCH with a specific C-RNTI in a specific downlink bandwidth part of the target candidate SpCell. The specific C-RNTI is the one indicated in a corresponding inner RRCReconfiguration. The specific downlink bandwidth part is the one indicated in the corresponding inner RRCReconfiguration;

The terminal activates suspended uplink grants of the CMG;

The terminal activates suspended PUCCH of the CMG;

The terminal activates suspended SRS of the CMG.

L2_MOBILITY_PERIOD_1 is from the moment when HARQ ACK for MOBILITY_GROUP_SWITCH_REQUEST is transmitted to the moment when the terminal switches to the CMG or candidate SpCell (i.e. terminal's transceiver is tuned to the CMG).

L2_MOBILITY_PERIOD_2 is from the moment when the terminal switches to the CMG/candidate SpCell to the moment when access to the target candidate SpCell is successfully completed.

L2_MOBILITY_PERIOD_3 is from the moment when access to the target candidate SpCell is successfully completed to the moment when HARQ ACK for MOBILITY_GROUP_SWITCH_RESPONSE is received.

Access to the target SpCell is considered successfully completed when uplink grant for new transmission addressed by the specific C-RNTI is received in the target SpCell.

Alternatively, access to the target SpCell is considered successfully completed when downlink assignment for new transmission addressed by the specific C-RNTI is received in the target SpCell.

Serving Mobility Group (SMG) and Default Mobility Group (DMG) are used interchangeably.

Additional Mobility Group (AMG) and Candidate Mobility Group (CMG) are used interchangeably.

SMG is equivalent to current serving SpCell and current serving SCells.

CMG is equivalent to currently non-serving candidate SpCell and currently non-serving candidate SCells.

A PCell/PSCell and a SCell in smg are called serving PCell/PSCell and serving SCell. A PCell/PSCell and a SCell in cmg are called candidate PCell/PSCell and candidate SCell.

UE and terminal are used interchangeably.

GNB and base station are used interchangeably.

PDCCH and downlink control channel are used interchangeably.

PDSCH and downlink shared channel and downlink traffic channel are used interchangeably.

PUCCH and uplink control channel are used interchangeably.

PUSCH and uplink shared channel and uplink traffic channel are used interchangeably.

Primary Cell and Primary SCG Cell are called SpCell.

CMG identifier in a MAC CE indicates RRCReconfiguration corresponding to a CMG.

CMG identifier in a MAC CE indicates the identifier of RRCReconfiguration applied to lower layer mobility).

CMG comprises a candidate SpCell and candidate SCells. SMG comprises serving SpCell and serving SCells.

The operations of the terminal are explained below.

<Preamble Transmission Power>

The terminal transmits the UECapabilityInformation to the base station. The UECapabilityInformation includes capability information related to lower layer mobility.

The terminal receives the RRCReconfigruation from the base station. The RRCReconfiguration includes UE specific search space configuration information for type 1 PDCCH order monitoring and a first RNTI for type 1 PDCCH order monitoring and common search space identifier for type2 PDCCH order monitoring and a second RNTI for type2PDCCH order monitoring. The RRCReconfiguration includes one or more inner RRCReconfiguration and associated mobility group identifier.

The terminal receives a PDCCH order from the base station.

The terminal determines the transmission power of the preamble. If the PDCCH order is a type1 PDCCH order, preamble transmission power is determined based on a first parameter set and pathloss of a first cell. The first parameter set includes at least a preambleReceivedTargetPower. The first parameter set is included in the system information block1 of the first cell. If PDCCH order is a type2 PDCCH order, preamble transmission power is determined based on a second parameter set and a first information (CMG identifier) and a second information (transmission power related information) and pathloss of a second cell. The second parameter set includes at least a preambleReceivedTargetPower. The second parameter set is included in an inner RRCReconfiguration corresponding to the first information. The second cell is determined based on the first information. The second information indicates how much more transmission power is added to the transmission power determined based on the second parameter set and pathloss of the second cell.

The terminal transmits a preamble to the base station based on the PDCCH order.

<Response and TTA>

The terminal transmits the UECapabilityInformation to the base station. The UECapabilityInformation includes capability information related to lower layer mobility.

The terminal receives the RRCReconfigruation from the base station. The RRCReconfiguration includes UE specific search space configuration information for type1 PDCCH order monitoring and a first RNTI for type1 PDCCH order monitoring and common search space identifier for type2 PDCCH order monitoring and a second RNTI for type2 PDCCH order monitoring. The RRCReconfiguration includes one or more inner RRCReconfiguration and associated mobility group identifier.

The terminal receives a PDCCH order from the base station. For type1 PDCCH order, the first RNTI and the UE specific search space determined from the UE specific search space configuration information are applied. For type2 PDCCH order, the second RNTI and the common search space determined from the common search space identifier are applied.

The terminal transmits a preamble to the base station based on the PDCCH order.

The terminal receives a response from the base station. A first response is received if type1 PDCCH order was received. A second response is received if type2 PDCCH order was received. For the first response and the second response, the UE specific search space determined from the UE specific search space configuration information is applied. For the first response, a third RNTI is applied. The third RNTI is predefined in the standard. For the second response, the first RNTI is applied.

The terminal determines Timing advance between downlink and uplink (TTA). If the type1 PDCCH order was received, the terminal determines TTA of a first cell based on the first field (TAC) and the subcarrier spacing for a first PUSCH transmission. The first cell is the cell where the first PDCCH order was received. The first PUSCH is the PUSCH transmission after the first response reception. If the type2 PDCCH order was received, the terminal determines TTA of a second cell based on the first field and the subcarrier spacing for the preamble transmission and the second field (CMG identifier).

<TAC MAC CE>

The terminal transmits the UECapabilityInformation to the base station. The UECapabilityInformation includes capability information related to lower layer mobility.

The terminal receives the RRCReconfigruation from the base station. The RRCReconfiguration includes one or more inner RRCReconfiguration and associated mobility group identifier.

The terminal receives a TAC MAC CE in a first cell.

The terminal determines Timing advance between downlink and uplink (TTA).

If the type1 TAC MAC CE is received, the terminal determines Timing advance between downlink and uplink (TTA) of a second TAG of a first mobility group based on the first field (TAC) and the second field (TAG ID) and a first subcarrier spacing. The first mobility group is the current serving mobility group. The first TAG is the TAG indicated by the second field. The first subcarrier spacing is the largest subcarrier spacing of active uplink bandwidth parts of the first TAG of the first mobility group.

If the type2 TAC MAC CE is received, the terminal determines Timing advance between downlink and uplink (TTA) of a second TAG of a second mobility group based on the first field (TAC) and the second field (TAG ID) and a third field (CMG ID field) and a second subcarrier spacing. The second mobility group is determined based on the third field. The second TAG is the TAG indicated by the second field. The second subcarrier spacing is the subcarrier spacing of a specific uplink bandwidth part of a specific candidate cell of the second TAG of the second mobility group. The identifier of the specific uplink bandwidth part is indicated in the corresponding inner RRCReconfiguration. The configuration information of the specific candidate cell is indicated in the corresponding inner RRCReconfiguration. Alternatively, the specific uplink bandwidth part is the uplink bandwidth part with the lowest uplink bandwidth part identifier. Alternatively, the specific uplink bandwidth part is the uplink bandwidth part with a specific uplink bandwidth part identifier (e.g. 0). The specific candidate cell is the candidate cell with the lowest serving cell identifier. Alternatively, the specific candidate cell is the candidate cell with a specific serving cell identifier (e.g. 0)

<Switching MAC CE>

The terminal transmits the UECapabilityInformation to the base station. The UECapabilityInformation includes capability information related to lower layer mobility.

The terminal receives the RRCReconfigruation from the base station. The RRCReconfiguration includes UE specific search space configuration information for type1 PDCCH order monitoring and a first RNTI for type1 PDCCH order monitoring and common search space identifier for type2 PDCCH order monitoring and a second RNTI for type2 PDCCH order monitoring. The RRCReconfiguration includes one or more inner RRCReconfiguration and associated mobility group identifier.

The terminal receives a PDCCH order from the base station. For type1 PDCCH order, the first RNTI and the UE specific search space determined from the UE specific search space configuration information are applied. For type2 PDCCH order, the second RNTI and the common search space determined from the common search space identifier are applied.

The terminal transmits a preamble based on the type2 PDCCH order for a first mobility group.

The terminal receives in a first cell a MAC CE for lower layer mobility execution toward the second mobility group. The first RNTI and the UE specific search space determined from the UE specific search space configuration information are applied for the MAC CE reception.

The terminal performs a first operation set in the first mobility group at a first point of time. The first operation set comprises stopping TAT and canceling BSR and canceling PHR. The first point of time is after the positive HARQ feedback for the MAC CE is transmitted and before the mobility group switch starts. The first cell belongs to the first mobility group.

The terminal performs a second operation set in the second mobility group at a second point of time. The second operation set comprise applying TTA having determined for the second mobility group based on the type2 PDCCH order. The second point of time is after the mobility group switch starts and before access to the target candidate cell is successfully completed.

The terminal performs a third operation set in the second mobility group at a third point of time. The third operation set comprises triggering BSR if has been cancelled and triggering PHR. The third point of time is after access to the target candidate cell is successfully completed and before the positive HARQ feedback for a second MAC CE (MOBILITY_GROUP_SWITCH_RESPONSE) is transmitted.

<Short Candidate Id>

UE determines short-candidate-id as followings:

Short-candidate-id is determined as below:
1> UE first determines one or more first type LTM-CandidateToAddMod;
  2> first type LTM-CandidateToAddMod is LTM-CandidateToAddMod with EarlyUL-SyncConfig (or RACH configuration for early sync; or RACH configuration for type 2 random access where only preamble transmission is performed);
  2> second type LTM-CandidateToAddMod is LTM-CandidateToAddMod without EarlyUL-SyncConfig (or RACH configuration for early sync; or RACH configuration for type 2 RACH)
1> UE assigns short-candidate-id to each of first type LTM-CandidateToAddMod such that the lowest unreserved id is assigned to the first type LTM-CandidateToAddMod with lowest LTM-CandidateId, and the second lowest unreserved id is assigned to the first type LTM-CandidateToAddMod with second lowest LTM-CandidateId and so on;
1> UE assigns the reserved id to the current serving cell (e.g. current SpCell);
  2> If reserved id is 0, the lowest unreserved id is 1.

For example as illustrated in FIG. 4L, short-candidate-id is:
0 for SpCell of current serving CG;
1 for SpCell of LTM-Candidate 0 (type1);
not allocated for SpCell of LTM-Candidate 1 (type2);
not allocated for SpCell of LTM-Candidate 2 (type2);
2 for SpCell of LTM-Candidate 3 (type1) and;
3 for SpCell of LTM-Candidate 4 (type1).

When UE receives a first PDCCH order, UE performs first random access procedure in the cell where the first PDCCH order is received.

When UE receives a second PDCCH order, UE performs second random access procedure in the cell indicated by the short-candidate-id in the second PDCCH order (e.g., if short-candidate-id is 2, the second random access procedure is performed in the SpCell of LTM-Candidate 3).

Figure 5A:
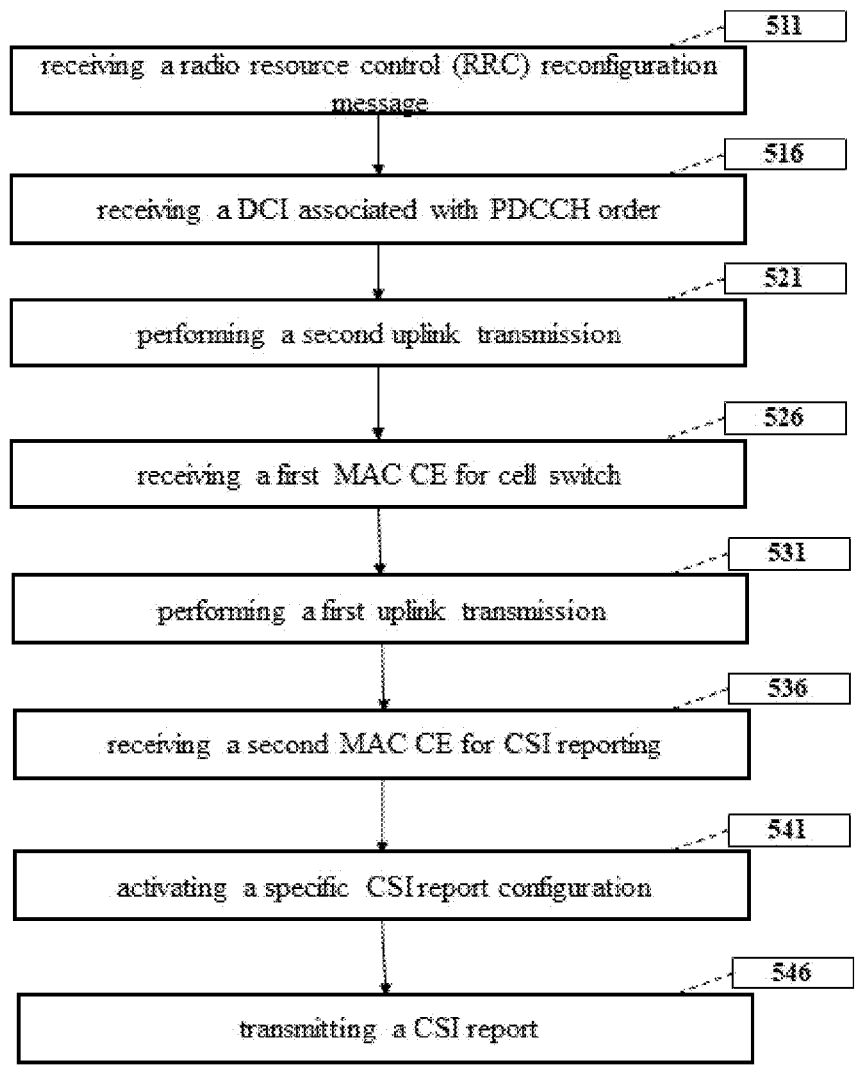
FIG. 5A is a flow diagram illustrating an operation of a terminal.

FIG. 5A illustrates operation of UE for random access.

UE performs followings for random access based on PDCCH order:
  receiving, in a serving cell from a base station, a radio resource control (RRC) reconfiguration message 511, wherein:
    the RRC reconfiguration message comprises one or more first identifiers; and
    one or more second identifiers are determined based on a specific set of first identifiers;
  receiving, in the serving cell from the base station, a downlink control information (DCI) associated with a physical downlink control channel (PDCCH) order 516, wherein the DCI comprises a second identifier;
  performing a second uplink transmission in a cell determined based on the second identifier 521;
  receiving, from the base station, a first medium access control (MAC) protocol data unit 526, wherein the first MAC PDU comprises a first identifier for cell switch;
  performing a first uplink transmission in a cell determined based on the first identifier 531.
  receiving, from the base station, a second MAC PDU 536, wherein the second MAC PDU comprises at least one field associated with channel state information (CSI) report;
  activating a specific CSI report configuration 541 based on the at least one field associated with CSI report; and
  transmitting a CSI report 546 based on the specific CSI report configuration.

The second identifier is associated with the serving cell in case that the second identifier is not determined based on the specific set of first identifier.

The second identifier is associated with a Layer1-/Layer2-Triggered Mobility (LTM) candidate cell in case that the second identifier is determined based on the specific set of first identifiers.

The second identifier is associated with the serving cell in case that the second identifier is determined based on a specific integer.

The second identifier is associated with a Layer1-/Layer2-Triggered Mobility (LTM) candidate cell in case that the second identifier is determined based on the specific set of first identifiers and a specific set of integers.

The specific set of first identifiers does not comprise the specific integer.

Each of the one or more first identifiers [candidate id] is associated with a candidate configuration of one or more candidate configurations; and the one or more candidate configurations are comprised in the RRC reconfiguration message.

Each of the one or more candidate configurations comprises:
  the first identifier; and
  an embedded RRC reconfiguration message.

The one or more candidate configurations comprises a first set of candidate configurations and a second set of candidate configurations.

The candidate configuration in the first set comprises a set of parameters for early uplink synchronization.

The candidate configuration in the second set does not comprise the set of parameters for early uplink synchronization.

The specific set of first identifiers comprises first identifiers of the first set of candidate configurations.

Lowest value of the second identifier indicates the serving cell.

Second lowest value of the second identifier indicates the LTM candidate cell with lowest value of the specific set of first identifiers.

Third lowest value of the second identifier indicates the LTM candidate cell with second lowest value of the specific set of first identifiers.

Highest value of the second identifier indicates the LTM candidate cell with highest value of the specific set of first identifiers.

The first uplink transmission is physical uplink shared channel transmission.

The second uplink transmission is physical random access channel transmission.

The first uplink transmission is performed based on configured grant.

The second uplink transmission is performed based on the set of parameters for early uplink synchronization.

The RRC reconfiguration message further comprises:
  a first Channel State Information (CSI) resource configuration list [LTM-CSI-ResourceConfig]; and
  one or more embedded RRC reconfiguration messages.

Each of the one or more embedded RRC reconfiguration messages comprises:
  a first CSI report configuration list [LTM-CSI-Report];
  a second CSI report configuration list [CSI-Report]; and
  a second CSI resource configuration list [CSI-ResourceConfig].

In case that a specific field [eLCID; L field] of the second MAC PDU is set to a specific value:
  the specific CSI report configuration is determined based on the first CSI report configuration list of a specific embedded RRC reconfiguration message; and
  the CSI report is generated based on the first CSI resource configuration list.

In case that a second specific field [LCID; R field] of the second MAC PDU is set to a second specific value:
  the specific CSI report configuration is determined based on the second CSI report configuration list of a specific embedded RRC reconfiguration message; and
  the CSI report is generated based on the second CSI resource configuration list of the specific embedded RRC reconfiguration message.

The specific embedded RRC reconfiguration message is determined based on the first identifier indicated in the first MAC PDU.

Figure 5B:
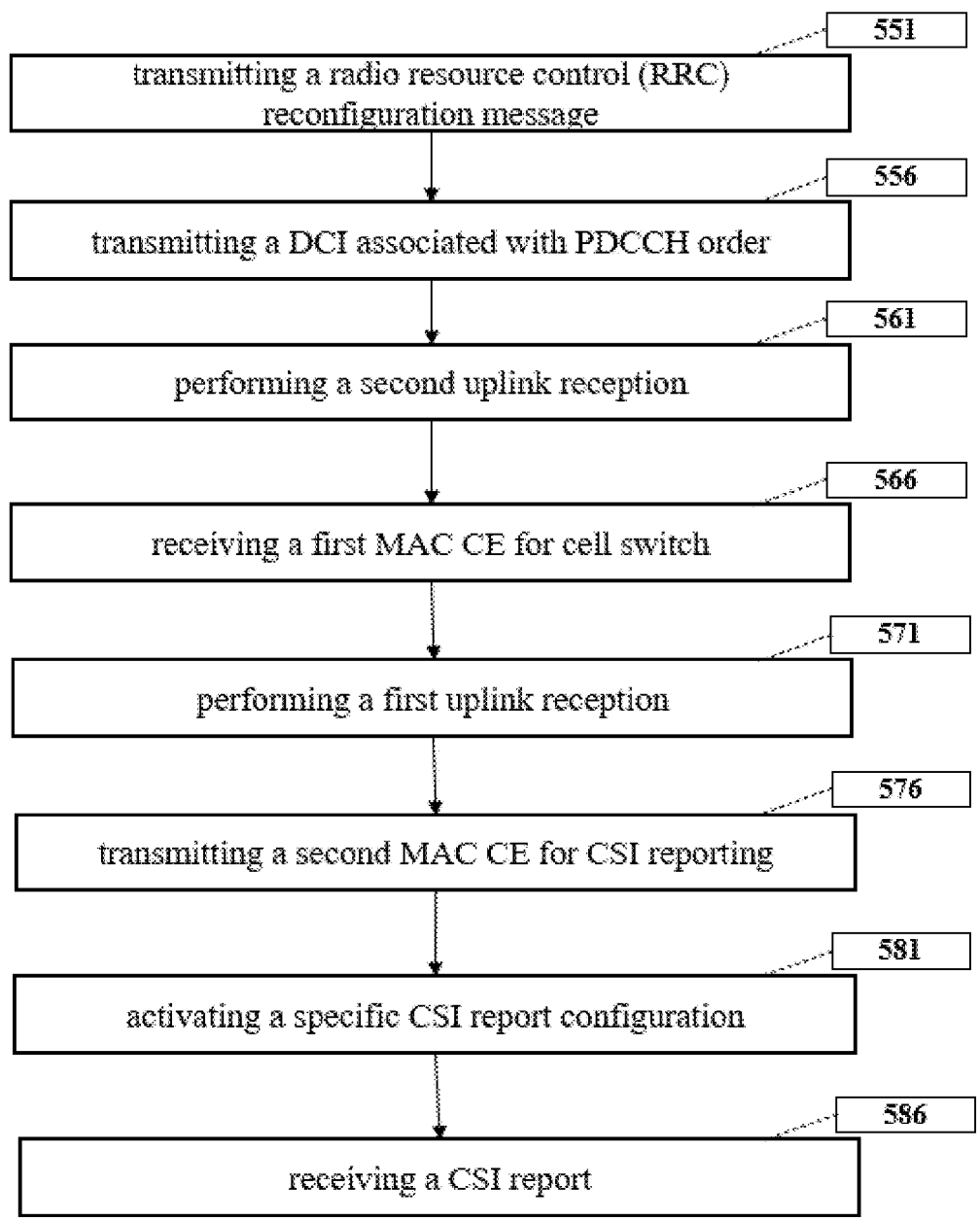
FIG. 5B is a flow diagram illustrating an operation of a base station.

FIG. 5B illustrates operation of base station for random access.

Base station performs followings for random access based on PDCCH order:
  transmitting, in a serving cell to a UE, a radio resource control (RRC) reconfiguration message 551, wherein:
    the RRC reconfiguration message comprises one or more first identifiers; and
    one or more second identifiers are determined based on a specific set of first identifiers;
  transmitting, in the serving cell to the UE, a downlink control information (DCI) associated with a physical downlink control channel (PDCCH) order 556, wherein the DCI comprises a second identifier;
  performing a second uplink reception in a cell determined based on the second identifier 561;

transmitting, to the UE, a first medium access control (MAC) protocol data unit 566, wherein the first MAC PDU comprises a first identifier for cell switch;
performing a first uplink reception in a cell determined based on the first identifier 571.
transmitting, to the UE, a second MAC PDU 576, wherein the second MAC PDU comprises at least one field associated with channel state information (CSI) report;
activating a specific CSI report configuration 581 based on the at least one field associated with CSI report; and
receiving a CSI report 586 based on the specific CSI report configuration.

The second identifier is associated with the serving cell in case that the second identifier is not determined based on the specific set of first identifier.

The second identifier is associated with a Layer1-/Layer2-Triggered Mobility (LTM) candidate cell in case that the second identifier is determined based on the specific set of first identifiers.

Figure 6A:
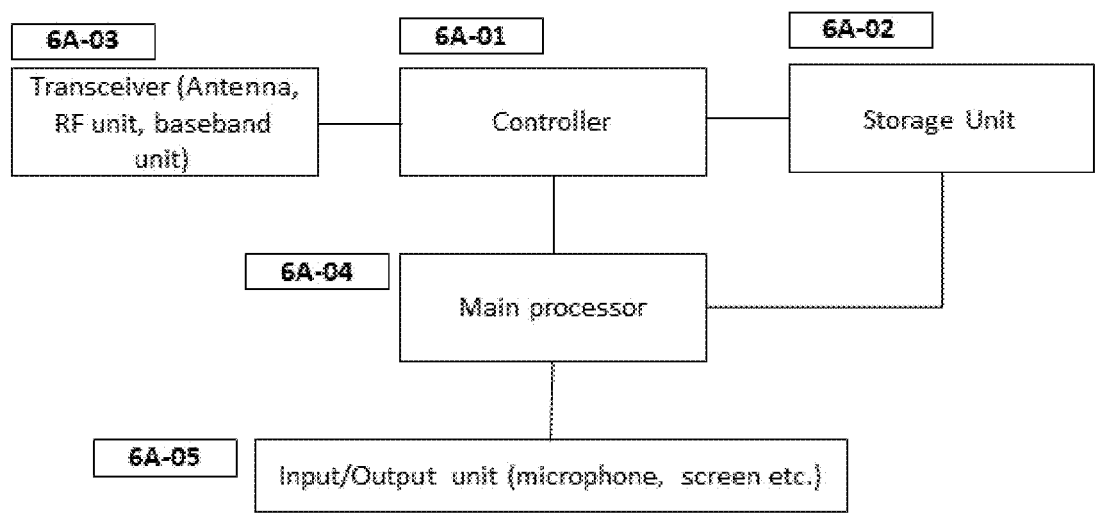
FIG. 6A is a block diagram illustrating the internal structure of a terminal.

FIG. 6A is a block diagram illustrating the internal structure of a UE to which the disclosure is applied.

Referring to the diagram, the UE includes a controller 6A-01, a storage unit 6A-02, a transceiver 6A-03, a main processor 6A-04 and I/O unit 6A-05.

The controller 6A-01 controls the overall operations of the UE in terms of mobile communication. For example, the controller 6A-01 receives/transmits signals through the transceiver 6A-03. In addition, the controller 6A-01 records and reads data in the storage unit 6A-02. To this end, the controller 6A-01 includes at least one processor. For example, the controller 6A-01 may include a communication processor $(CP)^{th}$ at performs control for communication and an application processor $(AP)^{th}$ at controls the upper layer, such as an application program. The controller controls storage unit and transceiver such that UE operations illustrated in the present disclosure are performed.

The storage unit 6A-02 stores data for operation of the UE, such as a basic program, an application program, and configuration information. The storage unit 6A-02 provides stored data at a request of the controller 6A-01.

The transceiver 6A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 6A-04 controls the overall operations other than mobile operation. The main processor 6A-04 process user input received from I/O unit 6A-05, stores data in the storage unit 6A-02, controls the controller 6A-01 for required mobile communication operations and forward user data to I/O unit 6A-05.

I/O unit 6A-05 consists of equipment for inputting user data and for outputting user data such as a microphone and a screen. I/O unit 6A-05 performs inputting and outputting user data based on the main processor's instruction.

Figure 6B:
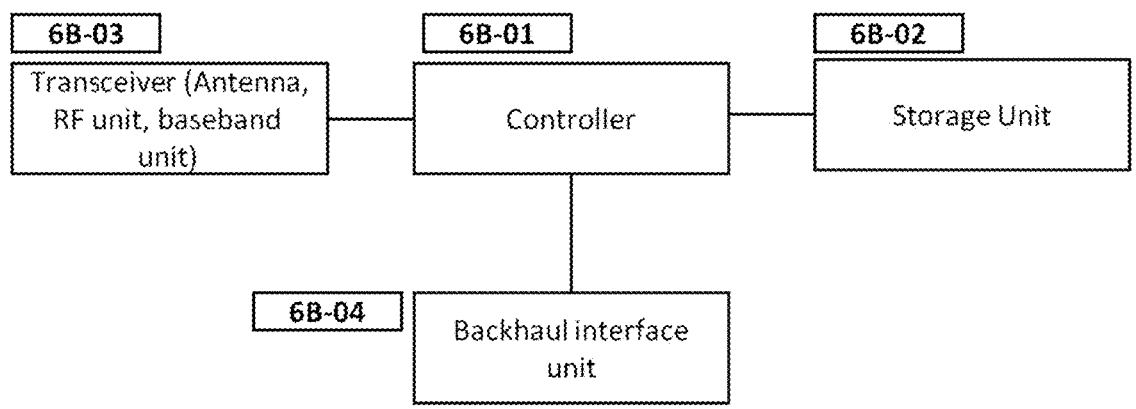
FIG. 6B is a block diagram illustrating the configuration of a base station.

FIG. 6B is a block diagram illustrating the configuration of a base station according to the disclosure.

As illustrated in the diagram, the base station includes a controller 6B-01, a storage unit 6B-02, a transceiver 6B-03 and a backhaul interface unit 6B-04.

The controller 6B-01 controls the overall operations of the main base station. For example, the controller 6B-01 receives/transmits signals through the transceiver 6B-03, or through the backhaul interface unit 6B-04. In addition, the controller 6B-01 records and reads data in the storage unit 6B-02. To this end, the controller 6B-01 may include at least one processor. The controller controls transceiver, storage unit and backhaul interface such that base station operation illustrated in the present disclosure are performed. The storage unit 6B-02 stores data for operation of the main base station, such as a basic program, an application program, and configuration information. Particularly, the storage unit 6B-02 may store information regarding a bearer allocated to an accessed UE, a measurement result reported from the accessed UE, and the like. In addition, the storage unit 6B-02 may store information serving as a criterion to determine whether to provide the UE with multi-connection or to discontinue the same. In addition, the storage unit 6B-02 provides stored data at a request of the controller 6B-01.

The transceiver 6B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 6B-04 provides an interface for communicating with other nodes inside the network. The backhaul interface unit 6B-04 converts a bit string transmitted from the base station to another node, for example, another base station or a core network, into a physical signal, and converts a physical signal received from the other node into a bit string.

What is claimed is:

1. A method performed by a terminal, the method comprising:
receiving, in a serving cell from a base station, a radio resource control (RRC) reconfiguration message, wherein:

the RRC reconfiguration message comprises one or more first identifiers; and
one or more second identifiers are determined based on a specific set of first identifiers;
receiving, in the serving cell from the base station, a downlink control information (DCI) associated with a physical downlink control channel (PDCCH) order, wherein the DCI comprises a field for a second identifier;
performing a second uplink transmission in a cell determined based on the field for the second identifier;
receiving, from the base station, a first medium access control (MAC) protocol data unit (PDU), wherein the first MAC PDU comprises a field for a first identifier for cell switch; and
performing a first uplink transmission in a cell determined based on the field for the first identifier,
wherein:
the second identifier indicates the serving cell in case that the second identifier is equal to a specific integer; and
the second identifier indicates a Layer1/Layer2-Triggered Mobility (LTM) candidate cell in case that the second identifier is determined based on the specific set of first identifiers.

2. The method of claim 1, wherein:
each of the one or more first identifiers is associated with a candidate configuration of one or more candidate configurations; and
the one or more candidate configurations are comprised in the RRC reconfiguration message.

3. The method of claim 2,
wherein each of the one or more candidate configurations comprises:
the first identifier; and
an embedded RRC reconfiguration message.

4. The method of claim 3, wherein:
the one or more candidate configurations comprise a first set of candidate configurations and a second set of candidate configurations;
candidate configuration in the first set comprises a set of parameters for early uplink synchronization; and
candidate configuration in the second set does not comprise the set of parameters for early uplink synchronization.

5. The method of claim 4,
wherein the specific set of first identifiers comprises first identifiers of the first set of candidate configurations.

6. The method of claim 5, for the second identifier, wherein:
the specific integer indicates the serving cell;
lowest value of a specific set of integers indicates the LTM candidate cell with lowest value of the specific set of first identifiers;
second lowest value of the specific set of integers indicates the LTM candidate cell with second lowest value of the specific set of first identifiers; and
highest value of the specific set of integers indicates the LTM candidate cell with highest value of the specific set of first identifiers.

7. The method of claim 4, wherein:
the first uplink transmission is transmission on physical uplink shared channel;
the second uplink transmission is transmission on physical random access channel;
the first uplink transmission is performed based on configured grant; and
the second uplink transmission is performed based on the set of parameters for early uplink synchronization.

8. The method of claim 1, wherein the method further comprising:
receiving, from the base station, a second MAC PDU, wherein the second MAC PDU comprises at least one field associated with channel state information (CSI) report;
activating a specific CSI report configuration based on the at least one field associated with CSI report; and
transmitting a CSI report based on the specific CSI report configuration.

9. The method of claim 8, wherein:
wherein the RRC reconfiguration message further comprises:
a first CSI resource configuration list; and
one or more embedded RRC reconfiguration messages.

10. The method of claim 9,
wherein each of the one or more embedded RRC reconfiguration messages comprises:
a first CSI report configuration list;
a second CSI report configuration list; and
a second CSI resource configuration list.

11. The method of claim 10,
wherein, in case that a specific field of the second MAC PDU is set to a specific value:
the specific CSI report configuration is determined based on the first CSI report configuration list of a specific embedded RRC reconfiguration message; and
the CSI report is generated based on the first CSI resource configuration list.

12. The method of claim 10,
wherein, in case that a second specific field of the second MAC PDU is set to a second specific value:
the specific CSI report configuration is determined based on the second CSI report configuration list of a specific embedded RRC reconfiguration message; and
the CSI report is generated based on the second CSI resource configuration list of the specific embedded RRC reconfiguration message.

13. The method of claim 11,
wherein the specific embedded RRC reconfiguration message is determined based on the first identifier indicated in the first MAC PDU.

14. The terminal comprising:
a transceiver,
a memory, and
a controller coupled to the transceiver and the memory, wherein the controller is configured to cause the terminal to:
receive, in a serving cell from a base station, a radio resource control (RRC) reconfiguration message, wherein:
the RRC reconfiguration message comprises one or more first identifiers; and
one or more second identifiers are determined based on a specific set of first identifiers,
receive, in the serving cell from the base station, a downlink control information (DCI) associated with a physical downlink control channel (PDCCH) order, wherein the DCI comprises a field for a second identifier;
perform a second uplink transmission in a cell determined based on the field for the second identifier, receive, from the base station, a first medium access control (MAC) protocol data unit (PDU), wherein the first MAC PDU comprises a field for a first identifier for cell switch, and perform a first uplink transmission in a cell determined based on the field for the first identifier, wherein:
- the second identifier indicates the serving cell in case that the second identifier is equal to a specific integer; and
- the second identifier indicates a Layer1/Layer2-Triggered Mobility (LTM) candidate cell in case that the second identifier is determined based on the specific set of first identifiers.

15. A method performed by a base station, the method comprising:

transmitting, in a serving cell to a terminal, a radio resource control (RRC) reconfiguration message, wherein:
- the RRC reconfiguration message comprises one or more first identifiers; and
- one or more second identifiers are determined based on a specific set of first identifiers;

transmitting, in the serving cell to the terminal, a downlink control information (DCI) associated with a physical downlink control channel (PDCCH) order, wherein the DCI comprises a field for a second identifier;

performing a second uplink reception in a cell determined based on the field for the second identifier;

transmitting, to the terminal, a first medium access control (MAC) protocol data unit (PDU), wherein the first MAC PDU comprises a field for a first identifier for cell switch; and performing a first uplink reception in a cell determined based on the field for the first identifier, wherein:
- the second identifier indicates the serving cell in case that the second identifier is equal to a specific integer; and
- the second identifier indicates a Layer1/Layer2-Triggered Mobility (LTM) candidate cell in case that the second identifier is determined based on the specific set of first identifiers.

* * * * *